(12) United States Patent
Tran

(10) Patent No.: US 8,814,094 B2
(45) Date of Patent: Aug. 26, 2014

(54) LOCKING MECHANISM WITH BI-MODAL ACTUATOR

(75) Inventor: Hai H. Tran, Liverpool, NY (US)

(73) Assignee: Tactair Fluid Controls, Inc., Liverpool, NY (US)

( * ) Notice: Subject to any disclaimer, the term of this patent is extended or adjusted under 35 U.S.C. 154(b) by 1542 days.

(21) Appl. No.: 12/418,814

(22) Filed: Apr. 6, 2009

(65) Prior Publication Data

US 2009/0283634 A1 Nov. 19, 2009

Related U.S. Application Data

(60) Provisional application No. 61/042,422, filed on Apr. 4, 2008.

(51) Int. Cl.
*B64C 25/26* (2006.01)

(52) U.S. Cl.
USPC ............ 244/129.4; 244/100 R; 292/144; 292/201; 70/275

(58) Field of Classification Search
USPC ...... 244/100 R, 102 A, 102 SL, 129.4, 129.5; 292/11, 14, 18, 24, 25, 30, 44, 45, 53, 292/70, 78, 95, 116, 117, 119, 129, 96, 240, 292/241, 194, 213, 214, 229, 195, 201, 292/341.15–341.17; 70/275, 277, 279.1, 70/DIG. 48
See application file for complete search history.

(56) References Cited

U.S. PATENT DOCUMENTS

| | | | | |
|---|---|---|---|---|
| 2,660,029 A | * | 11/1953 | Geyer | 60/709 |
| 3,504,406 A | * | 4/1970 | Schott | 24/603 |
| 4,337,912 A | * | 7/1982 | Watton | 244/102 R |
| 5,288,037 A | * | 2/1994 | Derrien | 244/102 SL |
| 6,279,853 B1 | * | 8/2001 | Brighton | 244/102 SL |
| 6,802,476 B2 | | 10/2004 | Collet et al. | |
| 6,811,118 B2 | * | 11/2004 | Collet et al. | 244/102 SL |
| 7,883,125 B2 | * | 2/2011 | Smith, III | 292/216 |
| 7,959,195 B2 | * | 6/2011 | Harvey et al. | 292/201 |
| 8,061,654 B2 | * | 11/2011 | Meyer et al. | 244/102 A |
| 8,070,094 B2 | * | 12/2011 | Collins | 244/102 A |
| 8,104,711 B2 | * | 1/2012 | Bennett et al. | 244/102 SL |
| 8,123,161 B1 | * | 2/2012 | Collins | 244/99.9 |
| 8,292,219 B2 | * | 10/2012 | Collins | 244/102 SL |
| 8,376,272 B2 | * | 2/2013 | Bennett et al. | 244/102 SL |
| 8,382,032 B2 | * | 2/2013 | Bennett et al. | 244/102 R |
| 8,398,020 B2 | * | 3/2013 | Bennett et al. | 244/102 SL |
| 2003/0155776 A1 | * | 8/2003 | Perez-Sanchez | 292/24 |
| 2003/0164421 A1 | * | 9/2003 | Collet et al. | 244/102 R |
| 2003/0164422 A1 | * | 9/2003 | Collet et al. | 244/102 R |
| 2008/0072695 A1 | | 3/2008 | Hudson et al. | |
| 2012/0037752 A1 | * | 2/2012 | Collins | 244/102 SL |
| 2012/0145827 A1 | * | 6/2012 | Collins | 244/102 A |

FOREIGN PATENT DOCUMENTS

| | | |
|---|---|---|
| EP | 0265197 | 4/1988 |
| WO | WO 2005/005252 | 1/2005 |
| WO | WO 2007/015104 | 2/2007 |

OTHER PUBLICATIONS

International Search Report for PCT/US2009/039620, mailed Nov. 23, 2009 (12 pages).

* cited by examiner

*Primary Examiner* — Benjamin P Lee
(74) *Attorney, Agent, or Firm* — Hiscock & Barclay, LLP

(57) ABSTRACT

A locking mechanism includes a hydraulic actuator component and an electronic actuator component that are arranged coaxially, each of the actuator components being arranged to control a locking member that retains a movable component. In one version, each of the actuator components can individually engage a mechanical detent to enable unlocking of the movable component, for use, for example, in an uplock mechanism for aircraft.

13 Claims, 33 Drawing Sheets

LOCKING MECHANISM WITH BI-MODAL ACTUATOR

CROSS REFERENCE TO RELATED APPLICATION

This application claims priority to a provisional application, U.S. Ser. No. 61/042,422, filed Apr. 4, 2008, the contents of which is herein incorporated by reference in its entirety.

FIELD OF THE INVENTION

This application generally relates to the field of locking mechanisms of the kind used in engaging and retaining a movable member. More specifically, an exemplary embodiment of this application relates to an actuator that enables a redundant lock and release of landing gear and landing gear door for aircraft.

BACKGROUND OF THE INVENTION

Aircraft landing gear and landing gear doors are typically held by means of a pivoted hook that is mounted within the undercarriage bay and arranged to capture a capture pin on the landing gear or landing gear doors. A latch holds the pivoted hook in the engaged position. Conventional uplock mechanisms include a hydraulic actuator that releases the lock and allows the hook to rotate out of engagement with the capture pin when the landing gear is to be lowered. In the event the hydraulic actuator fails, the pilot can release the lock by pulling a lever connected to one end of a mechanical cable connected to the latch. The latter provides an emergency and redundant release mechanism. This redundant release mechanism has proven to be reasonably effective, but there continues to be a general desire in the field to provide more effective and alternative locking mechanisms for applications of this and similar types.

SUMMARY OF THE INVENTION

According to one aspect, there is provided a locking mechanism that is selectively operable in one of a first mode and a second mode. In the first mode, a hydraulic actuator component of the locking mechanism engages a locking member and in the second mode a coupled electronic actuator component arranged coaxially with the hydraulic actuator component is used to engage the locking member. In one preferred version, the locking mechanism includes a mechanical detent that can be acted upon by either the hydraulic actuator component in the first mode or the electronic actuator component in the second mode; for example, in order to release the locking member. Preferably, each of the coaxial actuator components are maintained over center relative to a spring release or other means that are attached to the locking member to movably engage or release a movable member, such as those associated with aircraft landing gear.

In one described version, the mechanical detent is arranged coaxially in a chamber relative to the electronic and hydraulic actuator components of the locking mechanism. The activation of either the hydraulic or the electronic actuator components permits the contained mechanical detent to be selectively acted upon for unlocking the landing gear or other movable member.

In one described version, the locking mechanism is used in connection with an uplock mechanism for aircraft. According to one embodiment, latch members of a jaw assembly forming the locking member are maintained in a vertical attitude such that the weight of the landing gear will assist in the opening of same when the mechanical detent is released. In another embodiment, a J-hook member is engaged laterally in relation to an over center linkage that is disposed immediately beneath the detent housing, creating an efficient and extremely compact assembly.

According to another aspect, there is provided an uplock mechanism for use with aircraft landing gear, said mechanism comprising a hydraulic actuator component that engages a locking member in the first mode and an electronic actuator component arranged coaxially with the hydraulic actuator component that engages said locking member in said second mode. Each of the coaxial actuator components are maintained over center relative to a spring release attached to the locking member to engage and release a movable member connected to said locking member.

One advantage of the herein described locking mechanism is that low power and a very low mechanical stroke is required to provide the redundant actuator feature and in which dual sources can equally provide the necessary locking or unlocking operation. In addition, this feature is provided coaxially with the hydraulic actuator component wherein the same components (e.g., the mechanical detent) can be commonly utilized, thereby greatly simplifying the overall manufacture of the mechanism and affording very compact construction.

Providing the spring release over center of the actuator components also permits assured operation to perform a locking self-reset operation without hydraulic or electric power being required. This reset operation is provided by engaging the capture pin of the landing gear to the jaw assembly by an externally applied mechanical force. In one version, the guide of the jaw assembly also includes features preventing an over center linkage from over travel with respect to the pivot pin of the uplock mechanism, causing the jaw assembly to remain in a closed position.

These and other features and advantages will become readily apparent from the following Detailed Description, which should be read in conjunction with the accompanying drawings.

DETAILED DESCRIPTION

The following description relates to certain exemplary embodiments for a locking mechanism for an actuator assembly. More specifically, these embodiments each commonly relate to a bi-modal actuator that is described herein for use on aircraft as part of an uplock mechanism for engaging and releasing the landing gear in the "up" position or "down" position for safety and aerodynamic reasons. It will be readily apparent to one of reasonable skill, however, that various modifications and variations are possible in addition to those that are depicted. Moreover, it will also be apparent that there are a number of varied end uses to which the herein described structure can be applied in association with at least one locking member. Therefore, this description and the embodiments described herein are not intending to be limited to the field of endeavor that is herein specifically described. In addition, certain terms are also used throughout the body of this description in order to provide a convenient frame of reference with regard to the accompanying drawings. These terms, however, are also not intended to be overly limiting, except where specifically indicated otherwise.

Figure 1:
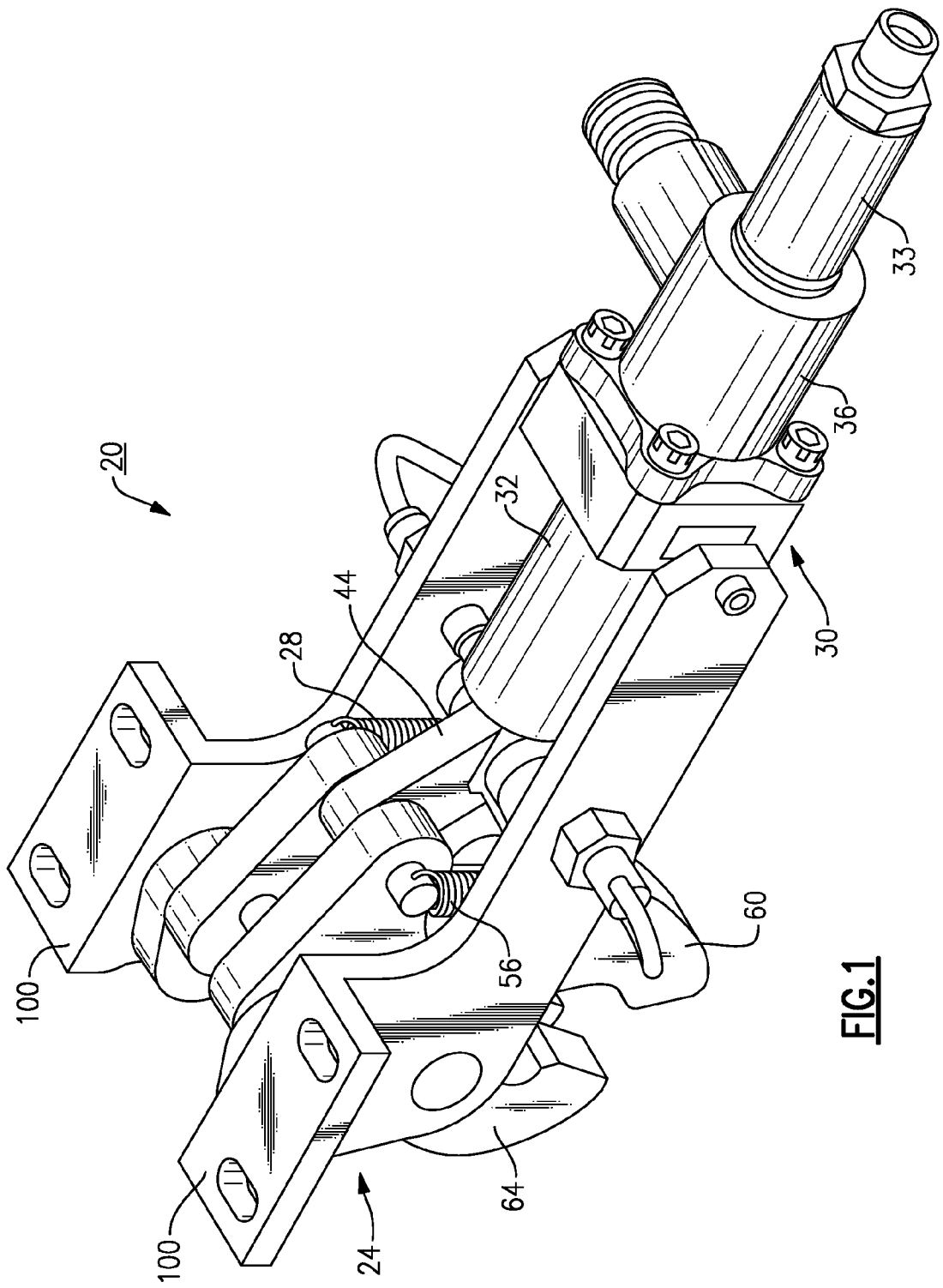
FIG. 1 is a top perspective view of a locking mechanism in accordance with a first embodiment.
Figure 2:
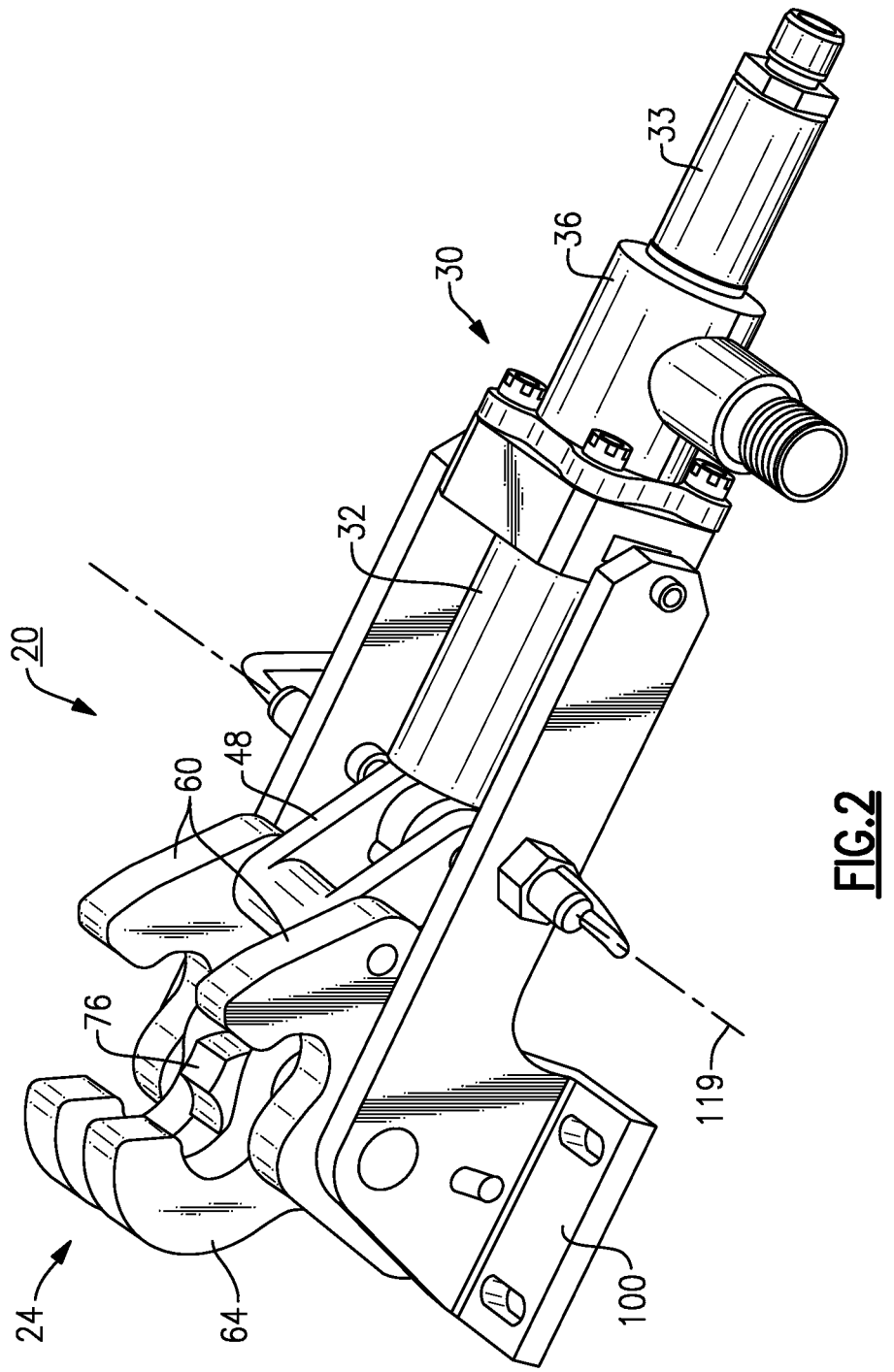
FIG. 2 is a bottom perspective view of the locking mechanism of FIG. 1.

Referring to FIGS. 1 and 2, there is shown a locking mechanism 20 that includes a jaw assembly 24 attached at one distal end of the mechanism, the jaw assembly being biased in an "open" or unlocked position by means of a spring release 28. An actuator assembly 30 is disposed in relation to the jaw assembly 24. According to this embodiment, the actuator assembly 30 includes an electronic actuator component 36 positioned in relation to a detent housing 32, the latter being attached at one end to the jaw assembly 24, as well as a coaxially arranged hydraulic actuator component 33. The relationship and functional operation of each noted component 33, 36 of the actuator assembly 30 in relation to the jaw assembly 24, as well as the spring release 28, will be described in greater detail in a subsequent section.

Figure 3:
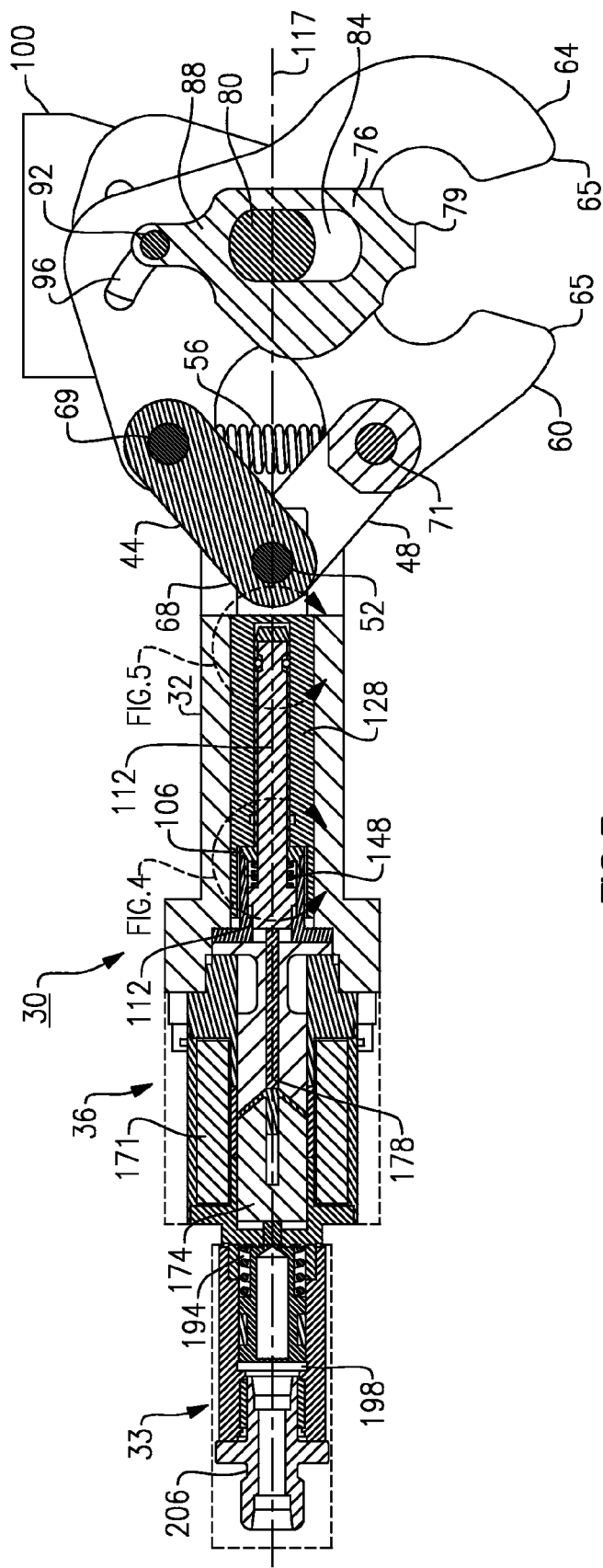
FIG. 3 is a partial side view, taken in section, of the locking mechanism of FIGS. 1 and 2.

An upper over-center link 44, FIG. 1, and a pair of lower over-center links 48, FIG. 2, are each commonly attached at respective proximal ends to an over center pin 52, FIG. 3, that is inserted through the distal end of a movable sleeve portion 128, FIG. 3, of the detent housing 32. An extension spring 56, forming the spring release 28 of the locking mechanism 20 according to this first embodiment, is attached to distal ends 68, FIG. 3, of the over center links 44, 48. Each over-center link 44, 48 is also pivotally attached by means of respective upper and lower pins 69, 71, FIG. 3, to pairs of respective latch members 60, 64 of the jaw assembly 24.

Referring to FIG. 3, there is shown a sectioned view of the locking mechanism 20 wherein the extension spring 56 provides a pivoting bias for the jaw assembly 24. Each latch member 60, 64 includes a curved end 65, the curved ends of the latch members 60, 64 being caused, based on the pivoting connection with the extension spring 56 and the upper and lower over-center links 44, 48, to open and close based on the axial position of the over center pin 52. A guide 76 is provided between the latch members 60, 64, the guide having an uplock pivot bolt 80 disposed within a slot or cavity 84 of the guide. An upper portion 88 of the guide 76 further includes a guide pin 92 that is movable within an angled slot 96 formed within one of the latch members 64. As will be described below, the latch members 60, 64 can be opened and closed based on the engagement of the actuator assembly 30 with the over center linkage. A mounting bracket 100 is attached to the jaw assembly 24 at the upper end of each of the latch members 60, 64, this end being opposite from the curved ends 65 thereof.

Figure 4:
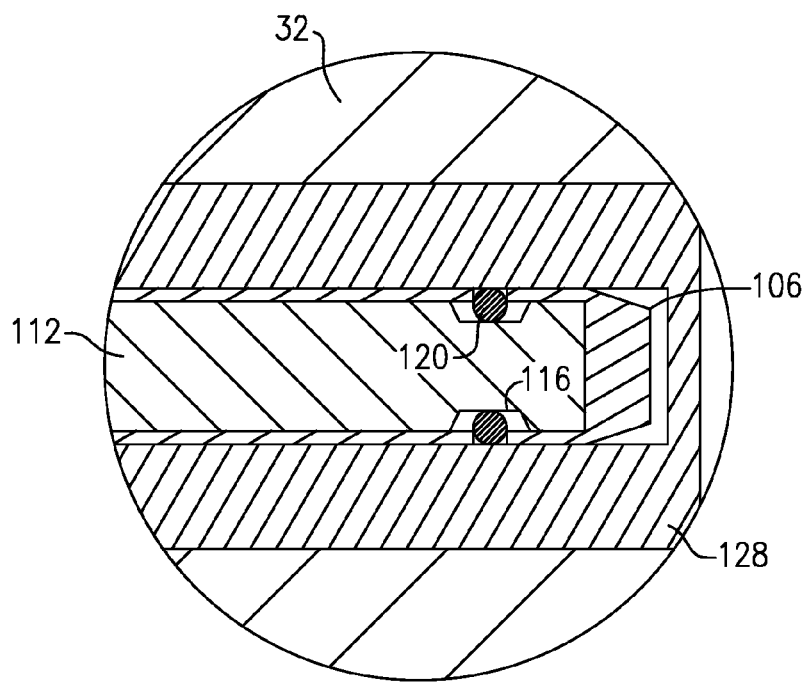
FIG. 4 is an enlarged detailed view of a portion of the detent chamber of the locking mechanism of FIG. 3.
Figure 5:
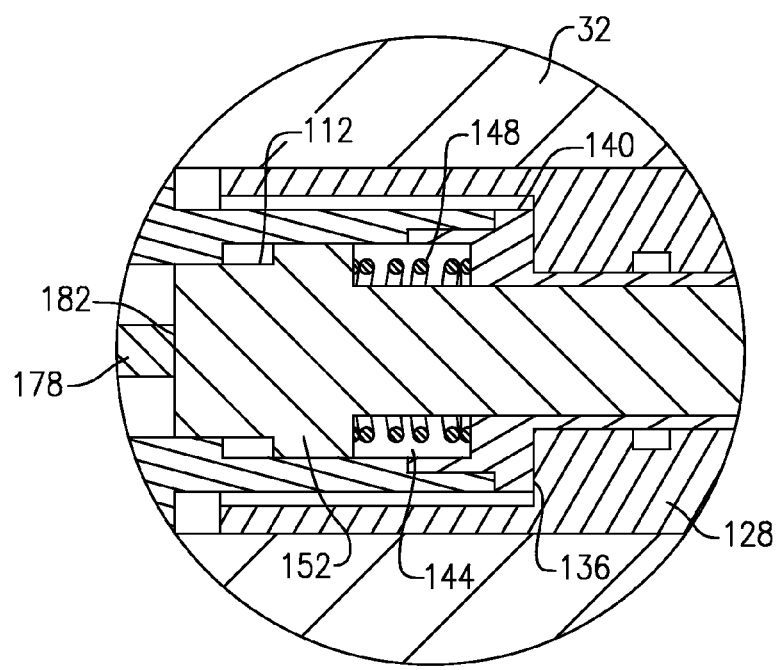
FIG. 5 is an enlarged detailed view of the detent spring of the locking mechanism of FIG. 3.

Referring to FIGS. 3-5, the detent housing 32 of the actuator assembly 30 includes a detent slide 106 extending axially through the interior of the housing, shown most particularly in FIG. 5. The detent slide 106 is formed as a longitudinal member extending substantially about the exterior of a detent latch 112, the latter including a groove 116 at one end thereof that permits the inclusion of a detent ball 120, shown more particularly in the enlarged detailed portion illustrated in FIG. 4. Alternatively, a lock segment (not shown) can be used in lieu of the detent ball 120. Each of the detent latch 112 and the detent slide 106 extend coaxially along an axis 117, FIG. 3, that further extends through an orthogonal pivot axis 119, FIG. 2, this latter axis being established through the primary axis of the over center pin 52. In addition, the over center pin 52 is attached to the distal end of a movable sleeve portion 128 of the detent housing 32 that is coaxially provided about the detent slide 106 and the detent latch 112. Referring to FIG. 5, the movable sleeve portion 128 includes an opposite or proximal end having an annular shoulder 136, which is initially engaged by a corresponding widened portion 140 of the detent slide 106, this latter portion of the detent slide having a larger diameter than the remainder thereof. The movable sleeve portion 128 further includes an interior annular recess 132, used in conjunction with the detent for locking the mechanism 20 in a manner described in greater detail below. As shown more particularly in FIG. 5, the detent slide 106 further includes a recess 144 that is sized to retain therein a detent spring 148 positioned between the widened portion 140 of the detent slide 106 and a widened proximal portion 152 of the detent latch 112. As described in greater detail below, the detent spring 148 creates a biasing force for the latch portion of the mechanism 20 when in the unlatched position as shown in FIG. 6(c) versus the latched position shown in FIG. 6(e).

Figure 6A:
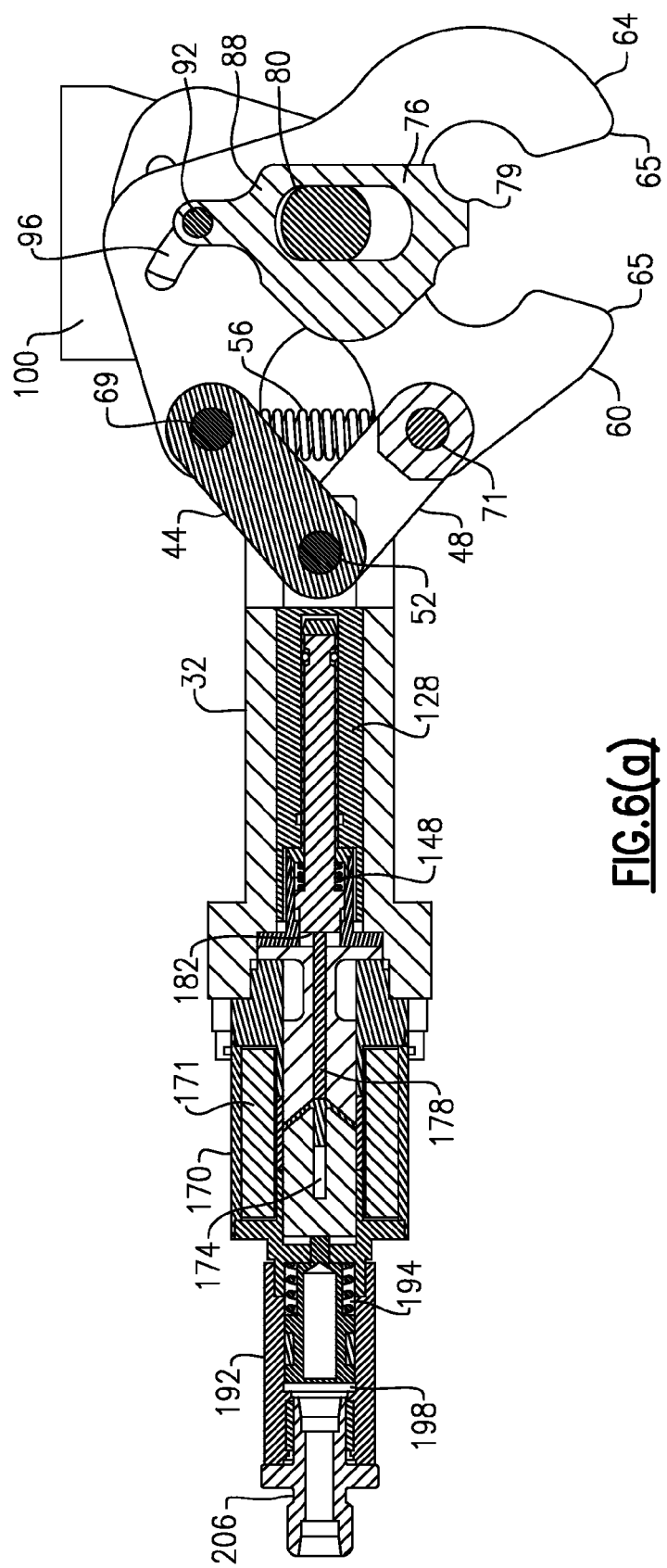
FIG. 6(a) is the side sectioned view of the locking mechanism of FIG. 3, illustrating the mechanism as unlocked in a hydraulically actuated mode.
Figure 6B:
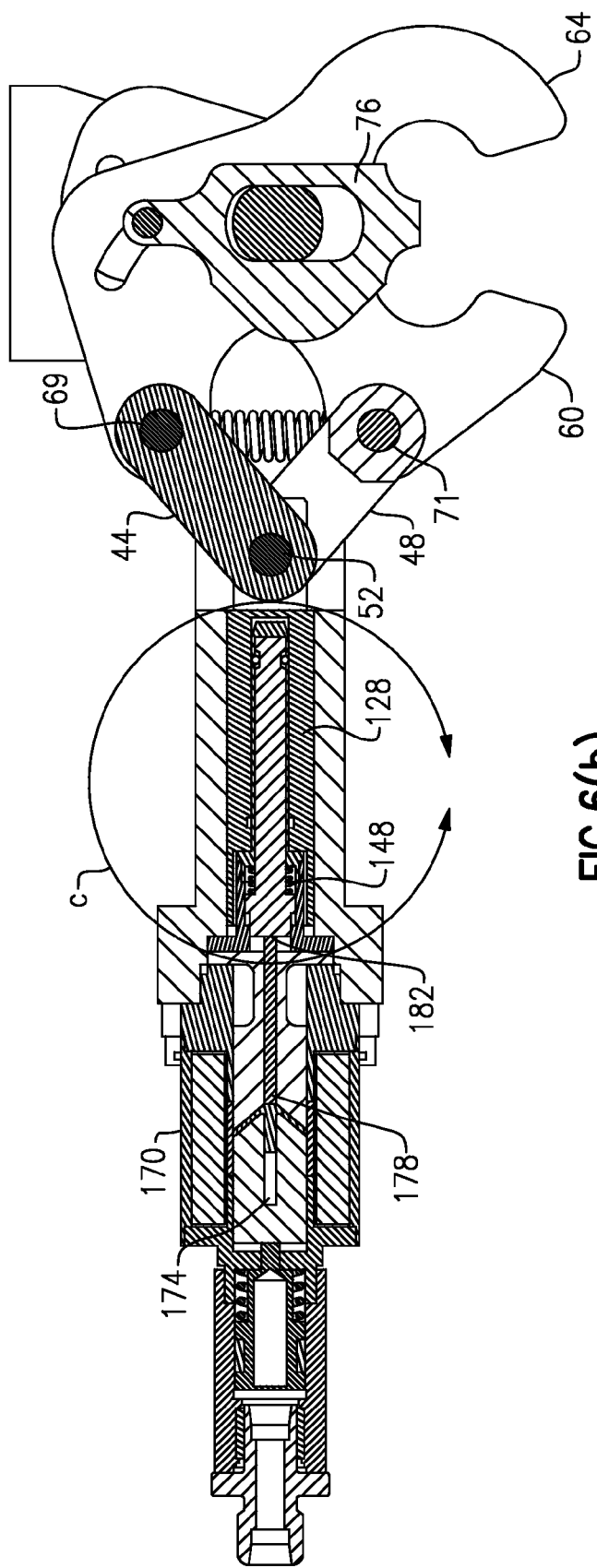
FIG. 6(b) is the side sectioned view of the locking mechanism of FIG. 3, illustrating the mechanism in an electronically actuated mode.
Figure 6C:
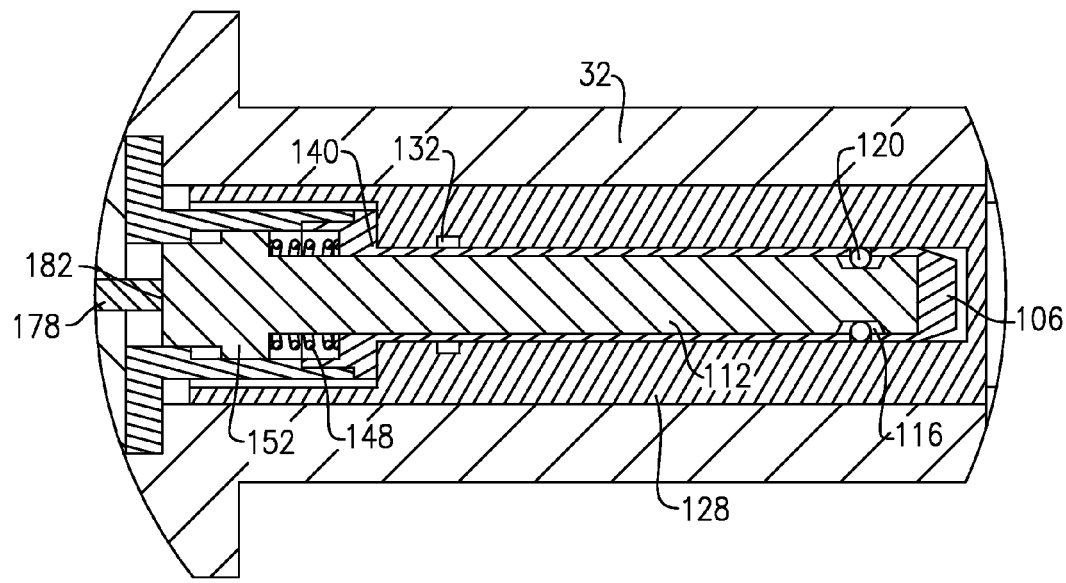
FIG. 6(c) is an enlarged detailed view of the detent chamber of the locking mechanism shown in FIG. 6(b), per Detail c thereof.
Figure 6E:
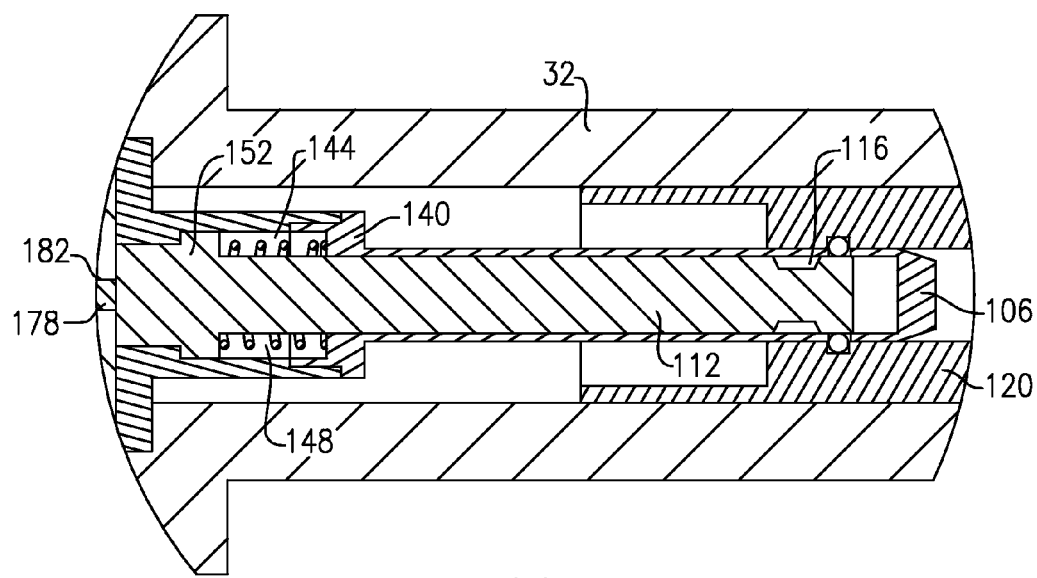
FIG. 6(e) is an enlarged detail view of the detent chamber of the locking mechanism shown in FIG. 6(d), per Detail e thereof.
Figure 6D:
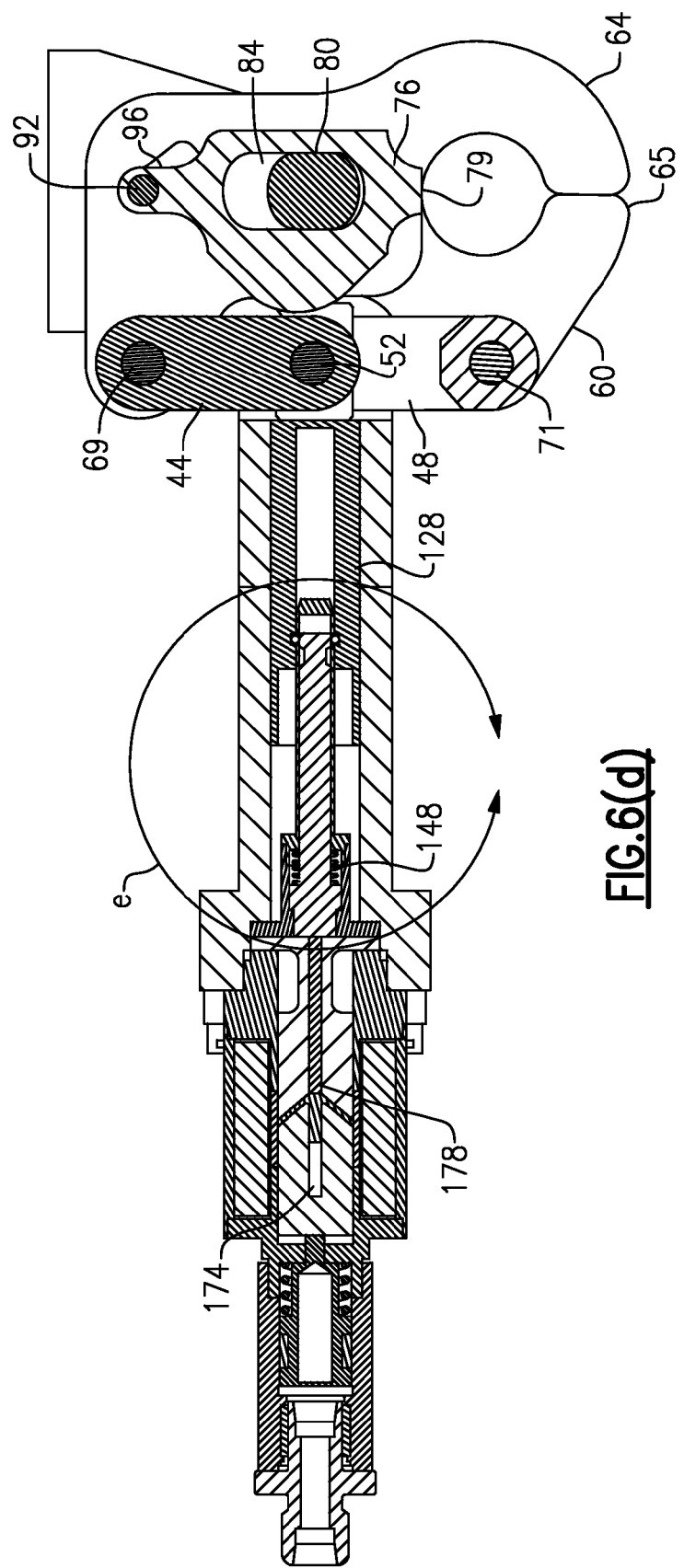
FIG. 6(d) is the side sectioned view of the locking mechanism of FIG. 6(b), but illustrating the mechanism in a locked or latched position.
Figure 7:
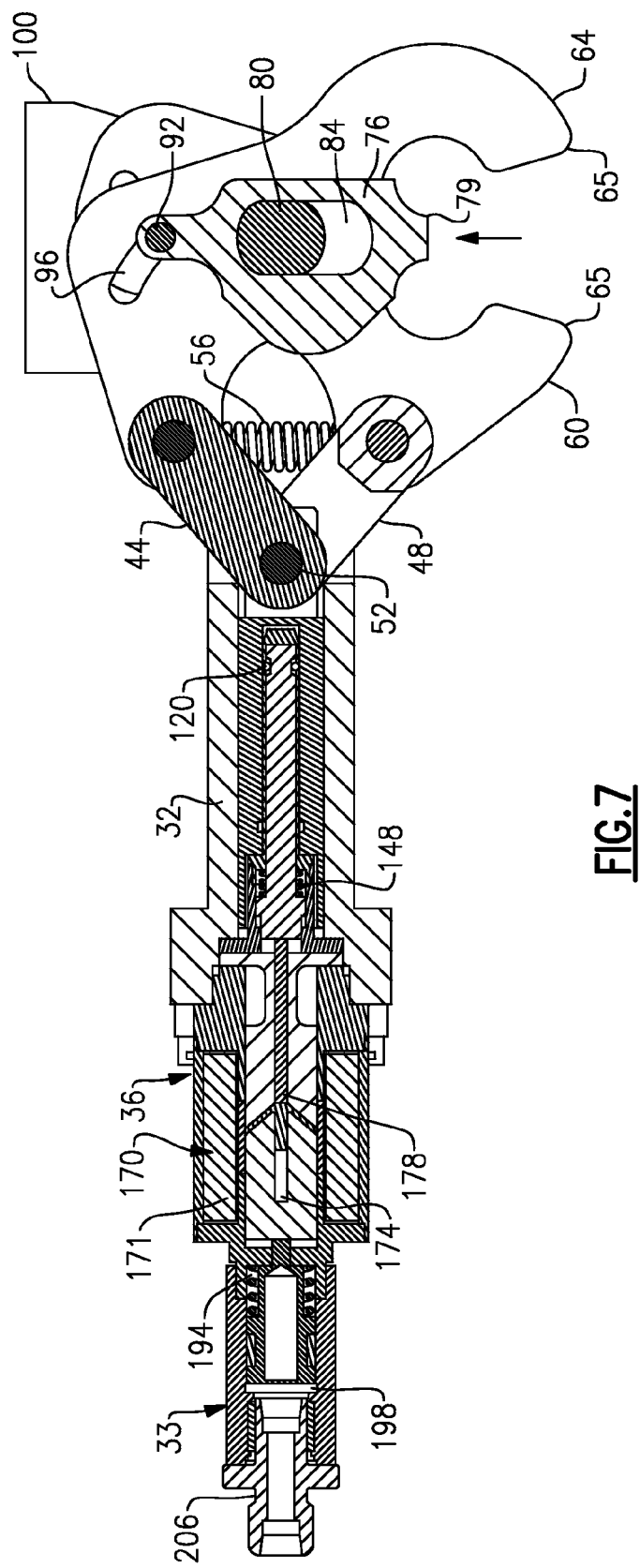
FIGS. 7-17 depict side views taken in section, these views sequentially illustrating an uplock locking operation of the locking mechanism of FIGS. 3-6(e), according to the first embodiment.
Figure 8:
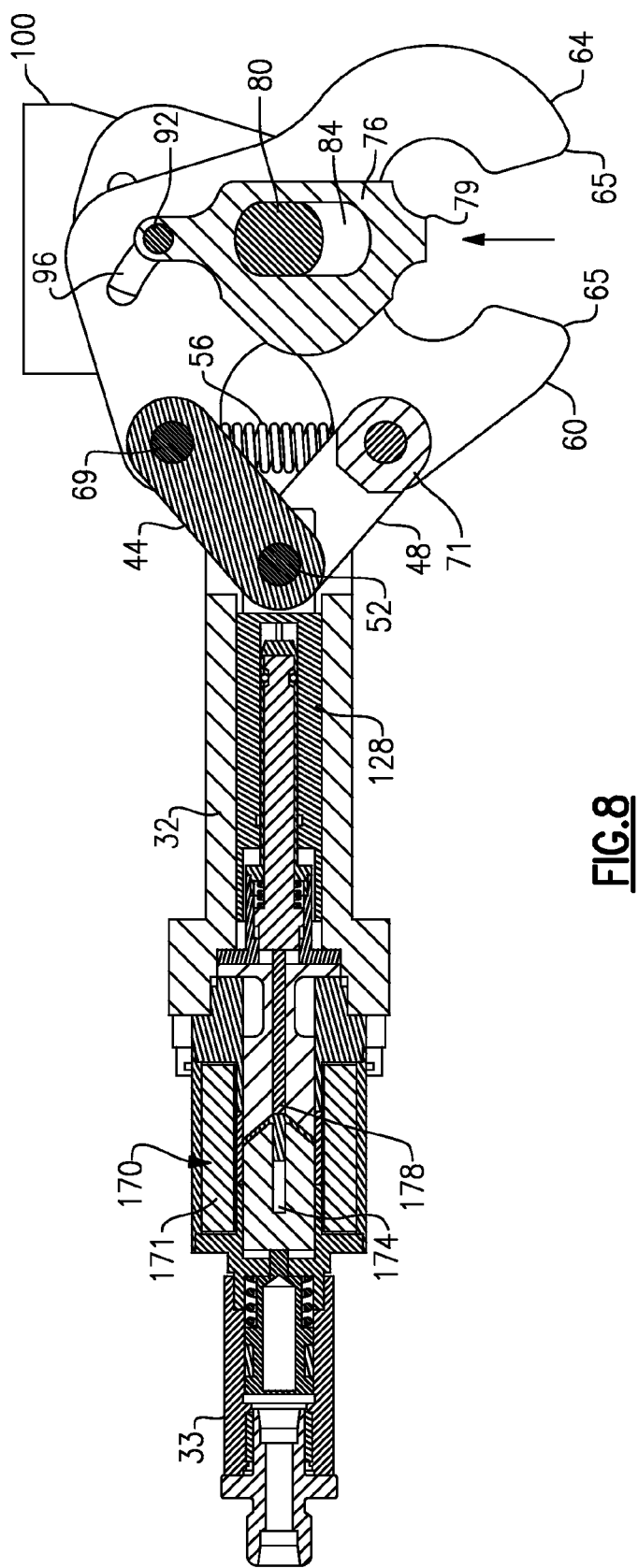
Figure 9:
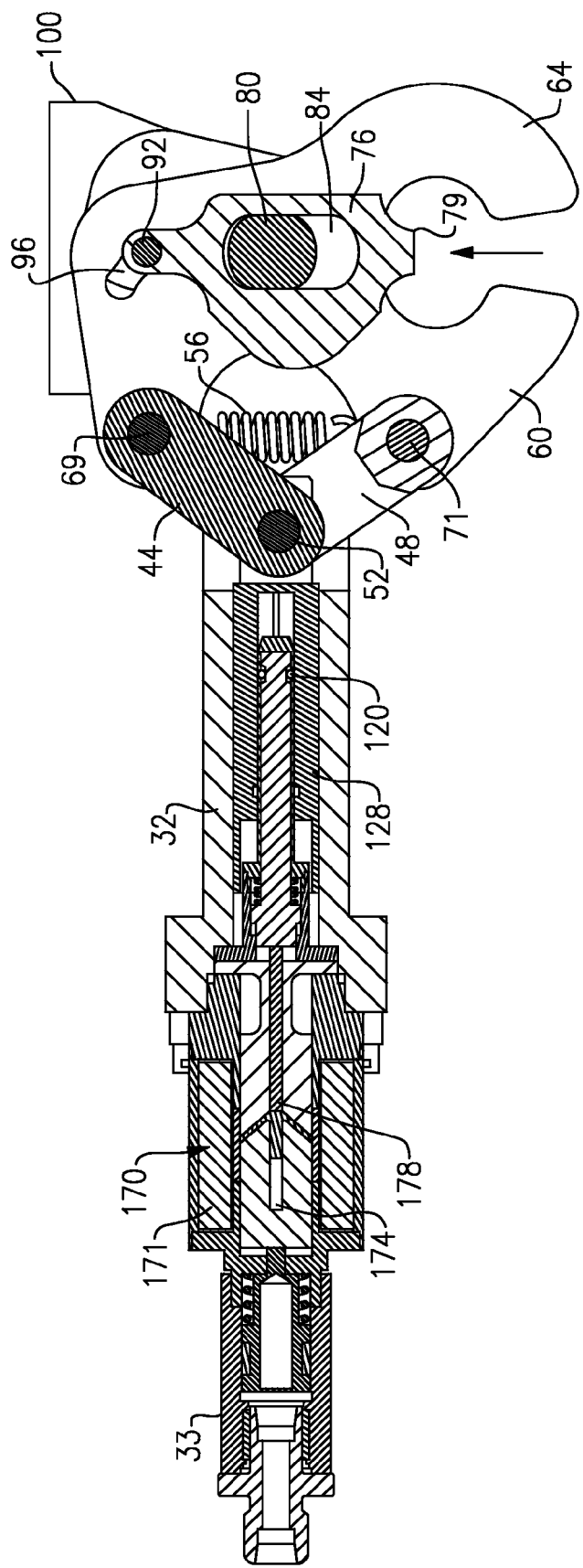
Figure 10:
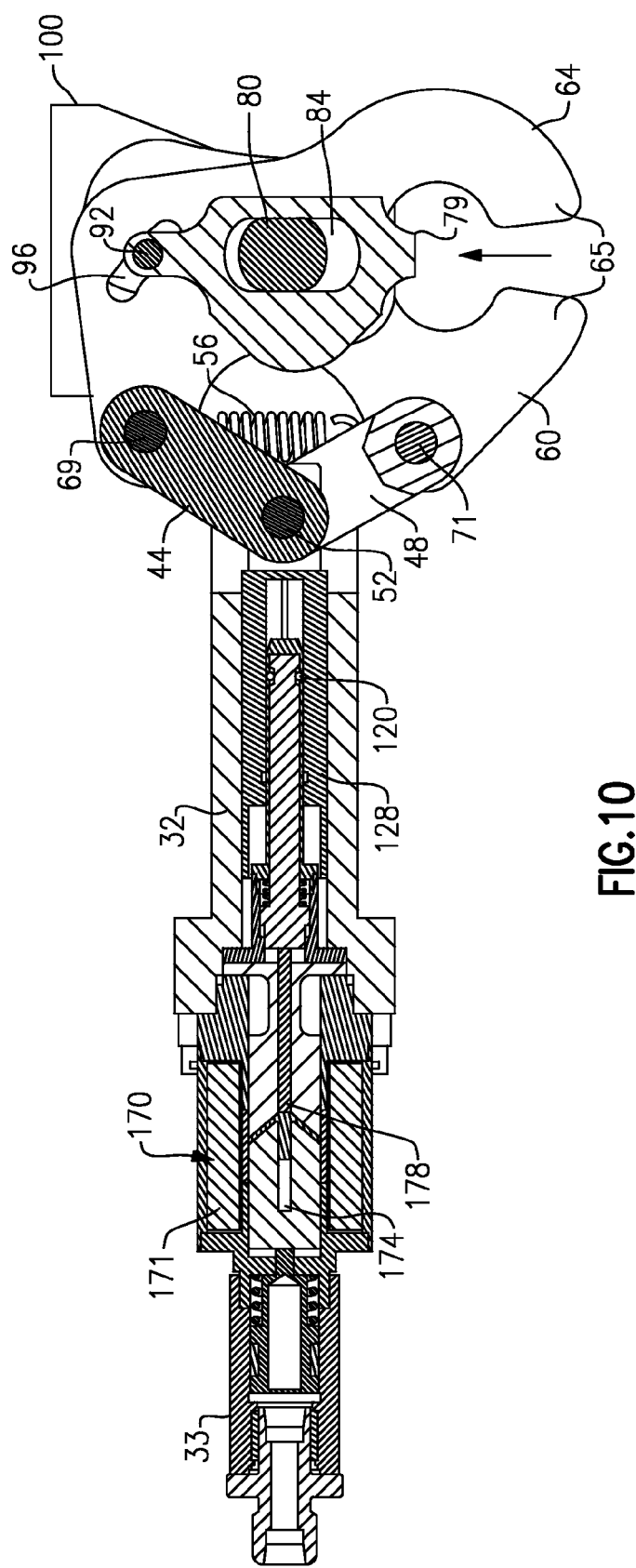
Figure 11:
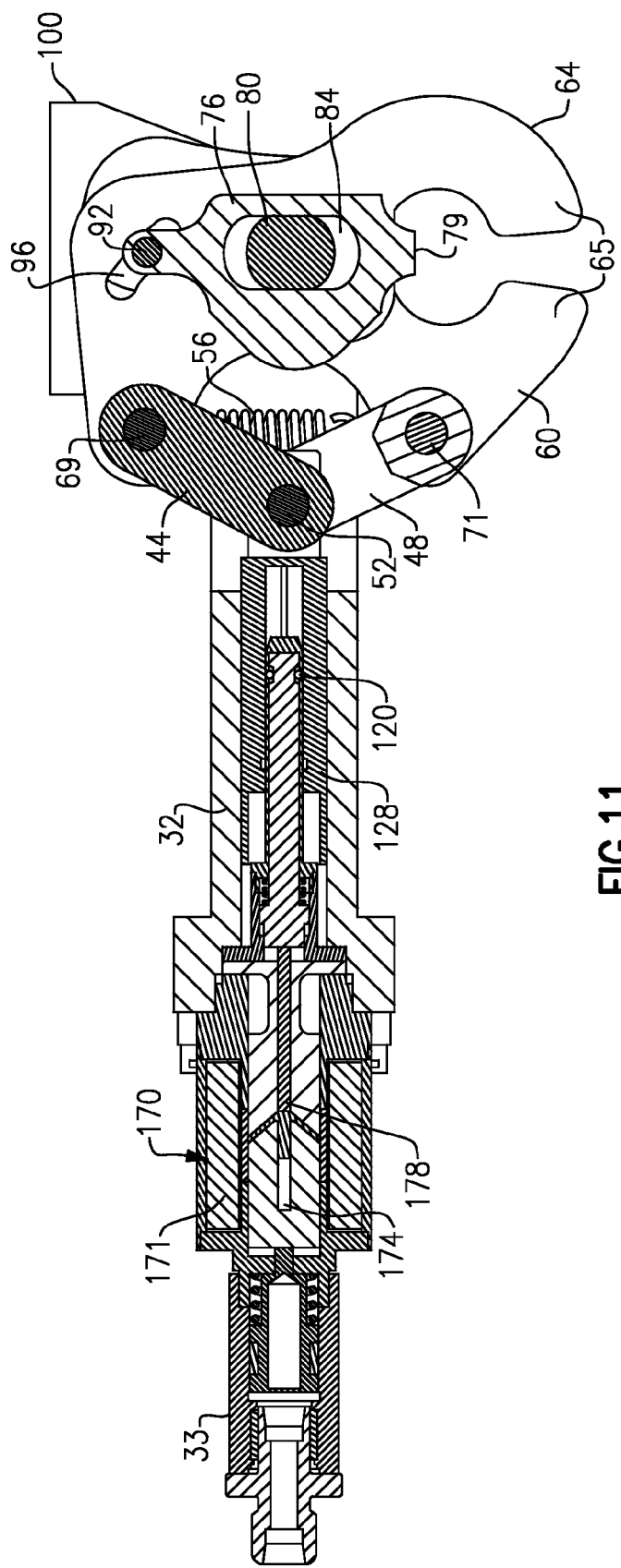
Figure 12:
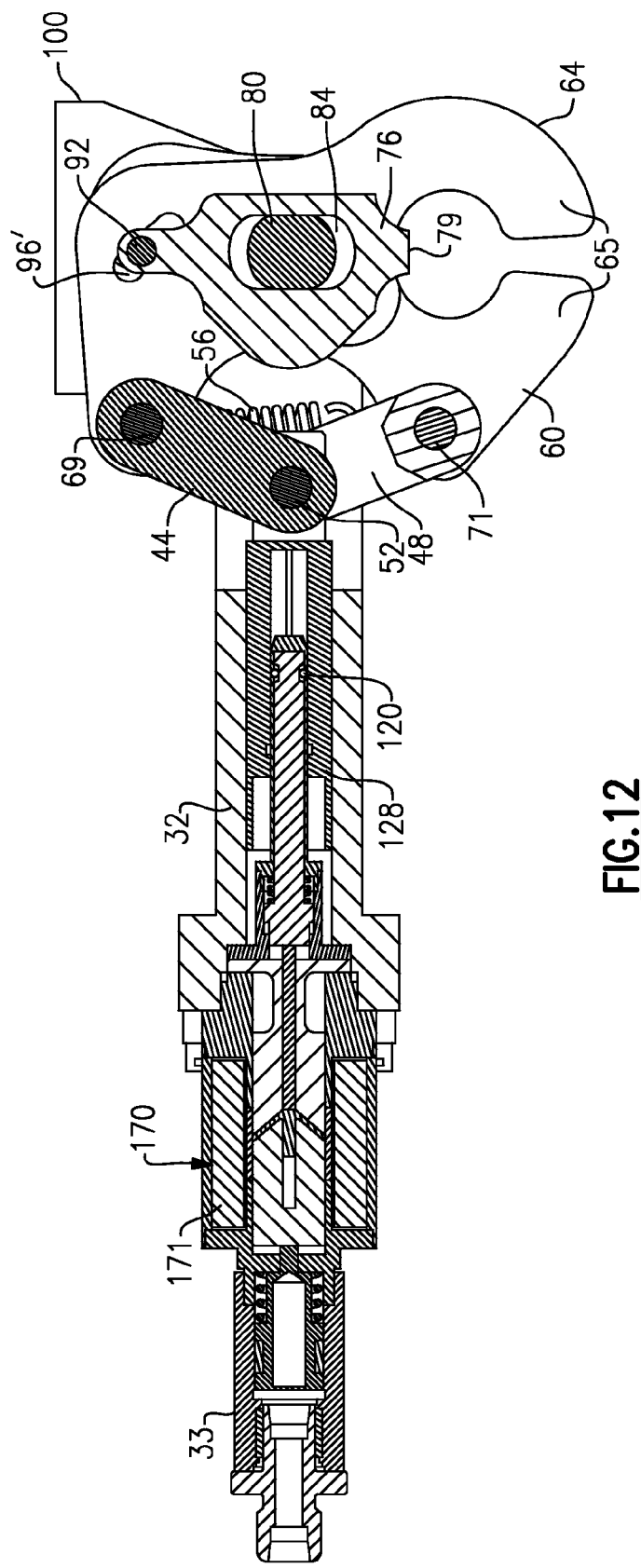
Figure 13:
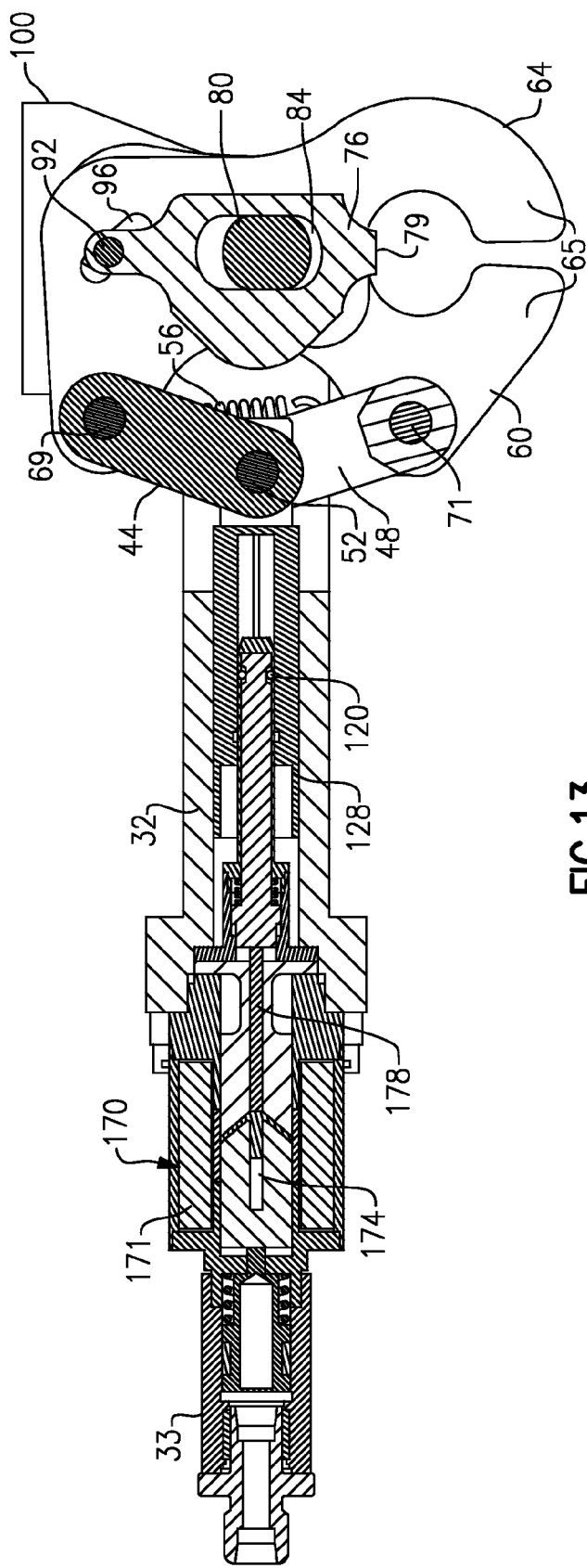
Figure 14:
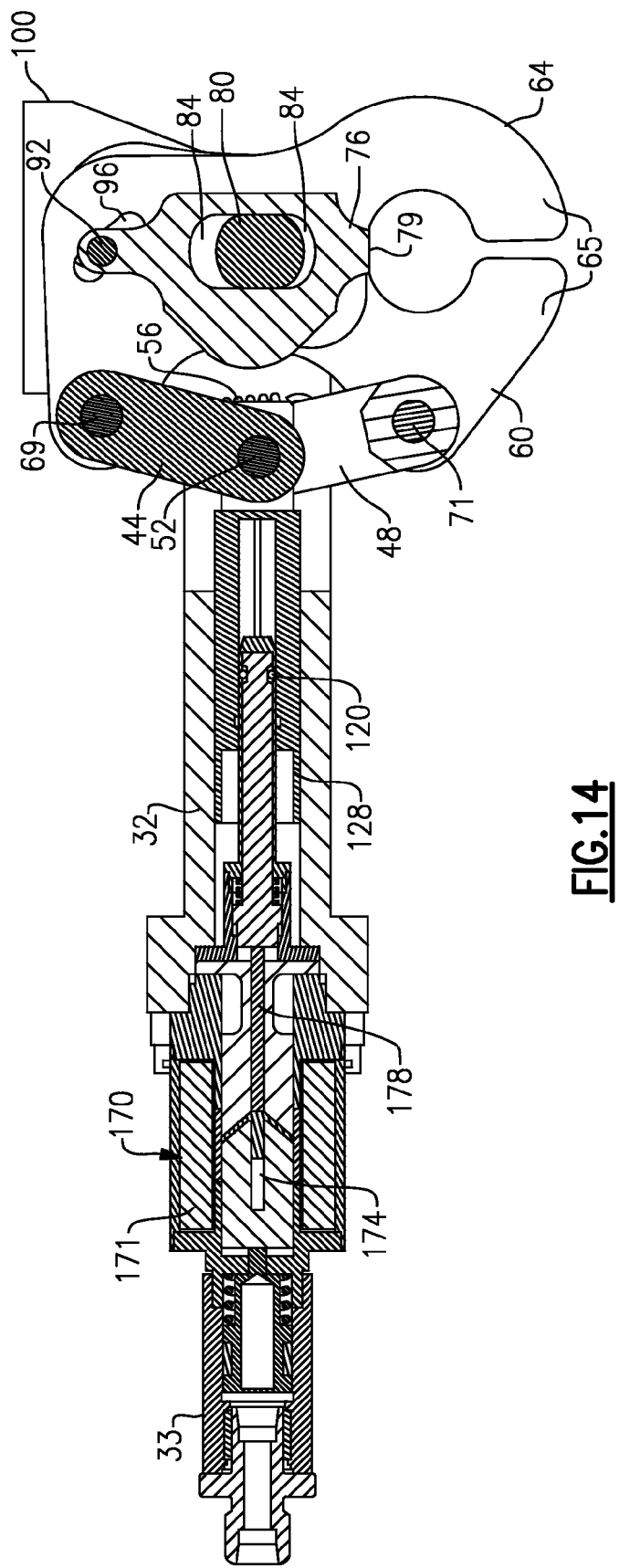
Figure 15:
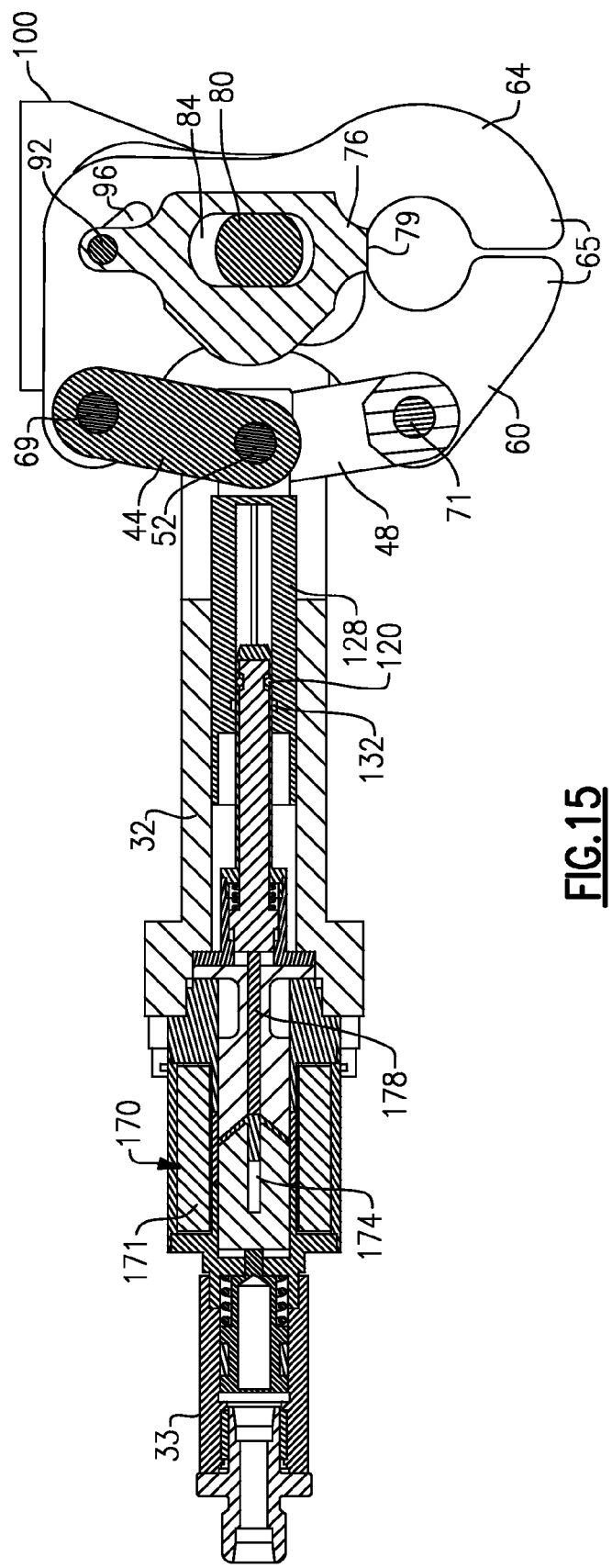
Figure 16:
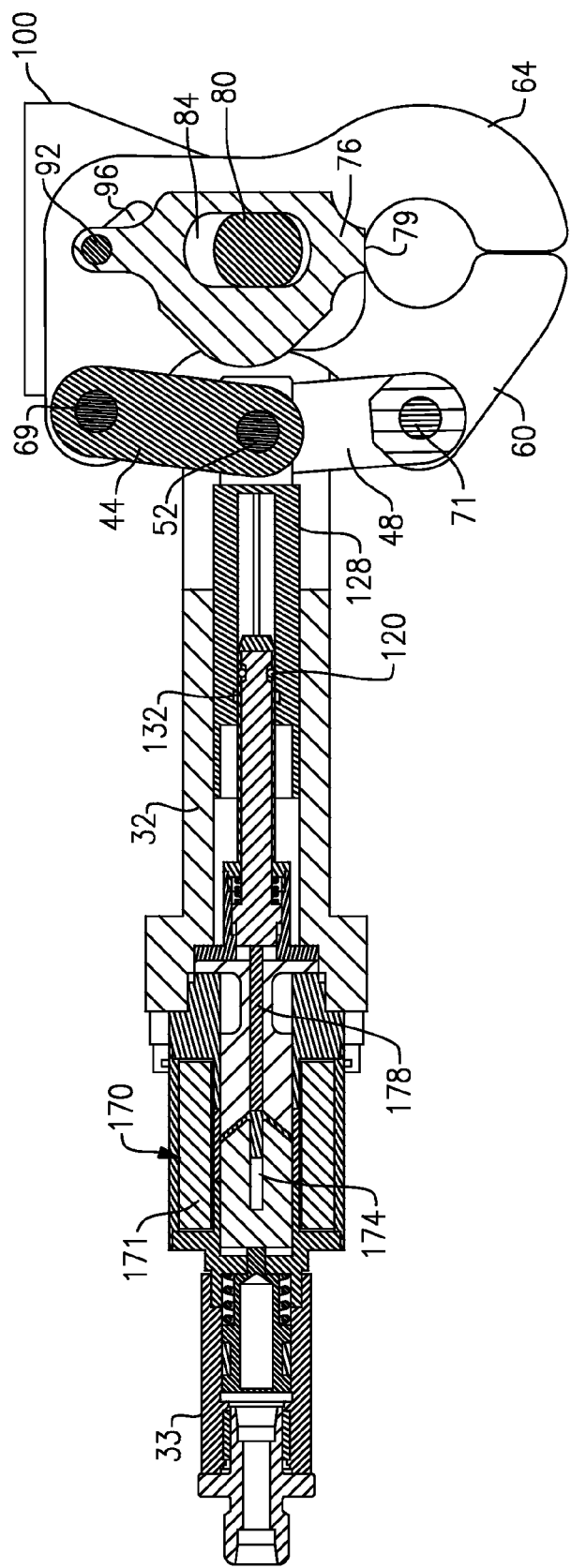

The electronic actuator component 36 according to this exemplary embodiment is a solenoid valve 170, FIG. 6(a), that is coaxially attached to the detent chamber 32. The solenoid valve 170 includes a coil 171, which is disposed about a solenoid plunger 174 and a solenoid pin 178. The solenoid pin 178 includes a surface 182, FIG. 6(a), that is engageable with the widened portion 140 of the detent slide 106. The solenoid pin 178 is movable in a direction that extends coextensively along the axis 117, FIG. 3. The solenoid valve 170 is attached by bracketry or other suitable means to the detent chamber 32.

The hydraulic actuator component 33 is coaxially attached to the electronic actuator component 36 and is defined by a chamber 192, FIG. 6(a), retaining an actuator spring 194 that is connected to a piston head 198, wherein an inlet pressure fitting 206 is attached thereto. The actuator chamber 192 is preferably hermetically sealed and includes a quantity of hydraulic fluid, which is retained therein.

The locking mechanism 20 utilizes the above actuator components 32, 33 for purposes of releasing (opening) the latch members 60, 64 of the jaw assembly 24 in order to release a movable component (e.g., the landing gear). Prior to describing the operational aspects of the actuators to engage (lock and unlock) latch, description is first made regarding the locking of the jaw assembly 24 of the herein described locking mechanism 20, also referred to by way of description as "uplock" for purposes of the present embodiment. The uplock operation according to this embodiment is shown sequentially according to FIGS. 7-17.

Figure 17:
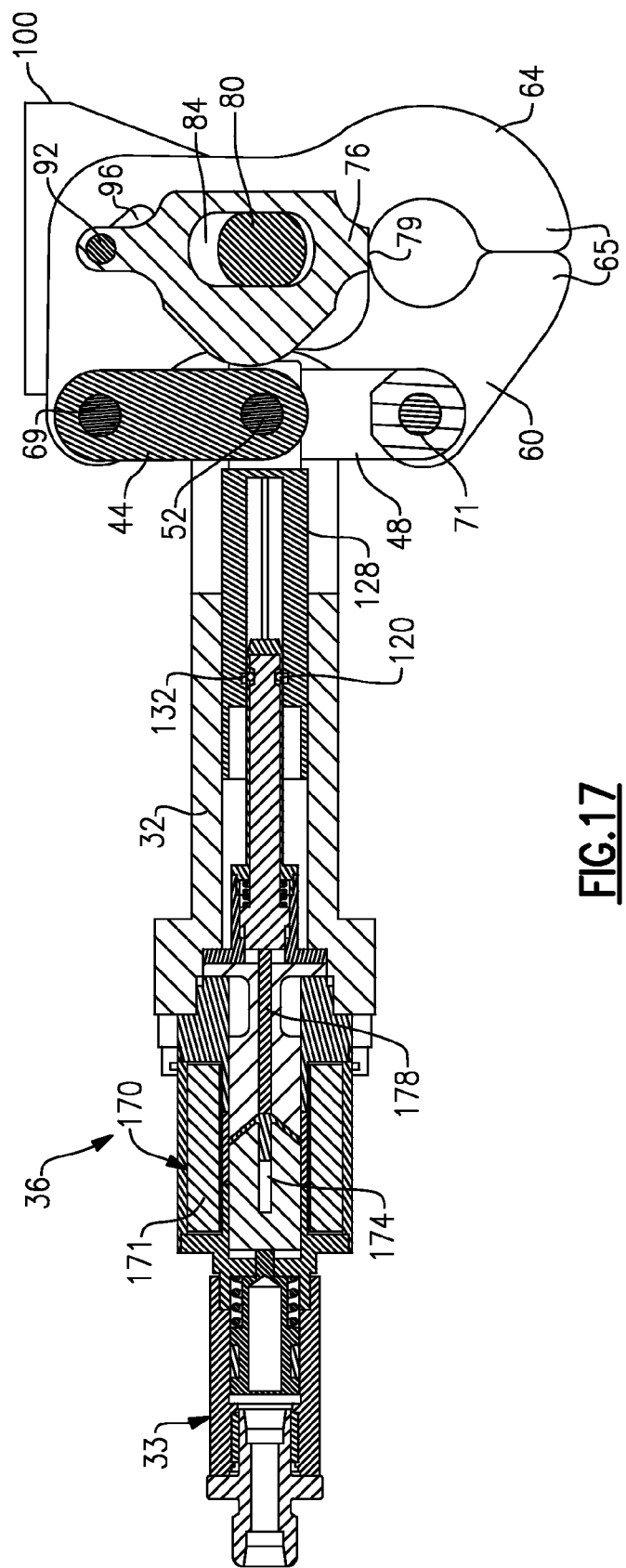

First, the landing gear roller (not shown) of the landing gear (not shown) is moved mechanically upward via avionics (not shown) on the aircraft toward a flattened lower or bottom surface 79 of the guide 76. As engagement between the landing gear roller and the guide 76 occurs, the guide 76 is shifted laterally and in an upward fashion within the slot 84 as supported by the uplock pivot bolt 80. This upward movement of the guide 76 works against the biasing force provided by the extension spring 56 and the pivotal connection with the upper and lower over center links 44, 48. As a result of this upward movement, the upper link 44 is caused to pivot in a counterclockwise fashion about the upper pin 69 while the lower link 48 is caused to pivot in a clockwise fashion about the lower pin 71. This resulting movement, based on the connection between the guide 76, the upper and lower over center links 44, 48 and the extension spring 56, loads the spring in compression and also causes the interconnected latch members 60, 64 to close. Therefore, the spacing between the curved ends 65 of the latch members 60, 64 is gradually reduced until the curved ends are substantially in contact with one another, as shown in FIG. 17. In the meantime, the guide 76 continues to shift upwardly and the guide pin 76 is caused to move within the curved slot 96, allowing the latch members 60, 64 to advance to a fully closed position.

As noted, this mechanical action occurs under the application of an upwardly directed external mechanical force provided upon the landing gear or landing gear door (not shown). The resulting pivotal movement of the upper and lower over-center links 44, 48 cause the movable sleeve portion 128 of the detent chamber 32 to be shifted in the axial direction 117 toward the linkage and jaw assembly 24 as the force of the extension spring 56 is counterbalanced, as shown sequentially in FIGS. 7-17. As a result of the foregoing movements, the movable sleeve portion 128 moves relative to the detent latch 112 until the recess 132 aligns with the groove 116, thereby dislodging the detent ball 120 from the groove 116. When the movable sleeve portion 128 has completed its axial movement, FIG. 17, the detent ball 120 is displaced from the groove 116 and secured within the recess 132 of the movable sleeve portion 128, as shown in FIGS. 17, 6(*d*) and 6(*e*), thereby locking or latching the movable sleeve portion in this position based on the engagement of the detent ball 120, and retaining the jaw assembly 24 in the closed position. The applied force to the landing gear can then be removed with the uplock being fully engaged. Neither of the actuators of this mechanism 20 require utilization in the uplock operation, as described, according to this embodiment.

Having described the locking or uplock operation of the locking mechanism 20, attention is directed to the release of the jaw assembly 24 and use of the actuator components. In brief and as shown in FIGS. 6(*a*) and 6(*b*), the locking mechanism 20 can be used in a so-called first or "standard" mode of operation using the hydraulic actuator component 33 to release the uplock (FIG. 6(*a*)) or alternatively, the electronic actuator component 36 can be used to initiate release of the locking mechanism, as shown in FIG. 6(*b*). For purposes of this portion of the description, the electronic actuator component is specifically referenced as the solenoid valve 170, while the actuator housings are not shown in these figures for purposes of clarity.

Referring first to FIG. 6(*a*) and from the preceding locked or latched position, initiation of the hydraulic actuator component 33 in the first mode proceeds wherein pressurization of the chamber 192 occurs using the inlet pressure fitting 206 to apply hydraulic pressure to the piston head 198 against the bias of the actuator spring 194. As a result, the piston head 198 is caused to move axially in the direction 117 within the sealed actuator chamber 192 and into engagement with the axially aligned solenoid plunger 174 and solenoid pin 178. The engagement surface 182 of the solenoid pin 178 is therefore caused to engage against the widened portion 152 of the detent latch 112 and move the detent latch against the bias of the detent spring 148. This axial movement of the detent latch 112 dislodges the detent ball 120 from the recess 132 of the movable sleeve portion 128 and into the groove 116 of the latch. As a result, the mechanism 20 is released or unlatched and the movable sleeve portion 128 is caused to move axially in the direction 117 away from the over center linkage and the jaw assembly 24. In the meantime, the force of gravity also acts upon the landing gear to provide an additional bias to release the gear in addition to the extension spring 56. Once the detent ball 120 is released, the extension spring 56 causes the upper link 44 to pivot in a clockwise fashion about the upper pin 69 and the lower link 48 to pivot in a counterclockwise fashion about the lower pin 71 toward the actuator with the interconnected latch members 60, 64 being caused to open and thereby effecting release.

Referring to FIGS. 6(*b*)-6(*d*) and according to an alternative emergency mode, such as when normal aircraft power (i.e., the hydraulic actuator component 33) is no longer available, activation of the solenoid valve 170 of the locking mechanism 20 can facilitated by means of a switch (not shown) in the cockpit of the aircraft (not shown) that energizes the coil 171, FIG. 3, of the solenoid causing the solenoid plunger 174 to engage the solenoid pin 178. In this instance, the solenoid valve 170 can be powered by an auxiliary power supply, such as a compact battery providing certain power requirements (e.g., 18-30 VDC).

In this latter mode, engagement of the surface 182 of the solenoid pin 178 against the widened portion 152, FIG. 5, of the detent latch 112 causes relative movement of the latch, in a manner similar to that effected by the hydraulic actuator component as described above, against the bias of the detent spring 148 and permits release of the detent ball 120 from the recess 132 of the movable sleeve portion 128, unlocking or unlatching the herein described mechanism 20.

It should be noted that very low power is required for energization of the above assembly wherein only a small stroke of the solenoid plunger/pin (less than 0.1 inch) is required for the unlocking of the detent ball 120 from the movable sleeve portion 128. As noted above, the release of the detent ball 120 from the groove 132 unlocks the jaw assembly 24 based on the action of the extension spring 56 in combination with the upper and lower links 44, 48, opening the interconnected latch members 60, 64 and releasing the capture pin of the landing gear. As previously noted, the force of gravity further assists in this release once the detent ball 120 has been unlocked from the recess 132 of the movable sleeve portion 128. Once the detent ball 120 has been dislodged from the recess 132, the movable sleeve portion 128 is caused to move (in either hydraulic or electric mode) in the direction 117 toward the actuator components 33,36. In the meantime, the detent latch 112 is still not in reset mode when the solenoid pin 178 is retracted and the valve 170 is deenergized, wherein the widened portion 152 of the detent latch 112 is not contacting the housing and the detent ball 120 is still captured within the groove 116. In summary and according to this present discussion, the operation of either the hydraulic or the electronic actuator components 33, 170 of the locking mechanism 20 causes the opening of the jaw assembly 24 and the release of the landing gear from the uplock assembly.

Referring to FIGS. 18-31, a locking mechanism 300 made in accordance with a second exemplary embodiment is herein described.

Figure 18:
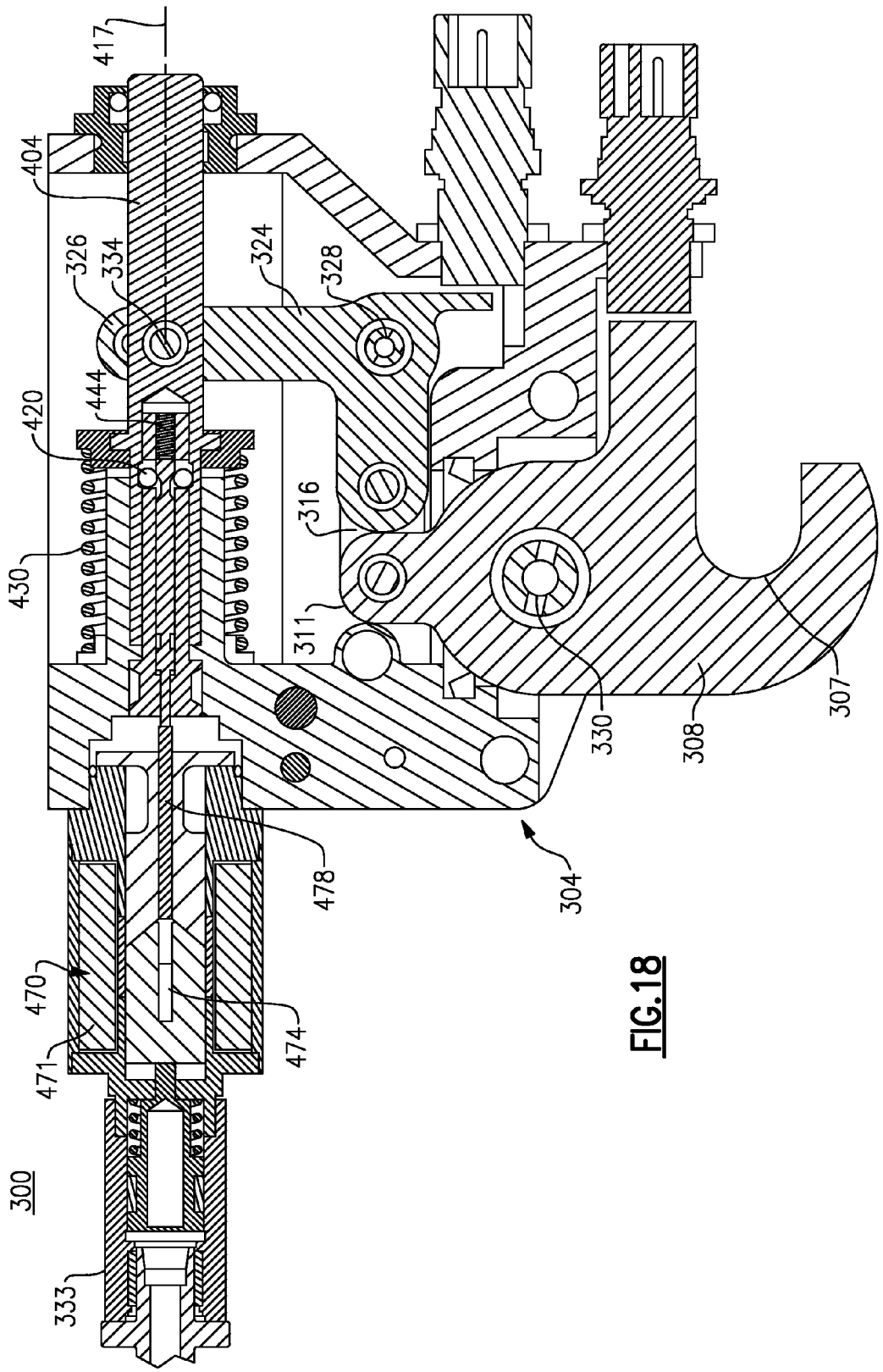
FIG. 18 is a partial side view, taken through line 18-18 of FIG. 19, of an uplock mechanism made in accordance with a second exemplary embodiment, the mechanism being depicted in a latched position.
Figure 19:
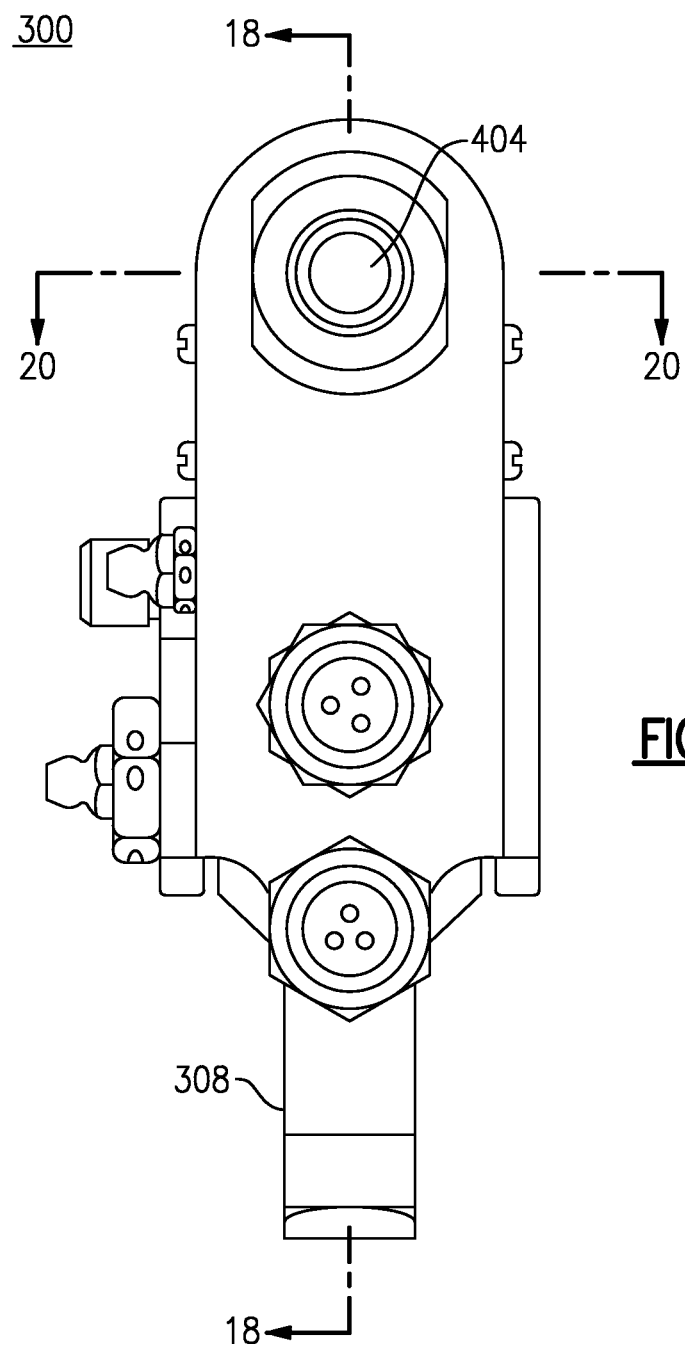
FIG. 19 is an end view of the uplock mechanism of FIG. 18.
Figure 20:
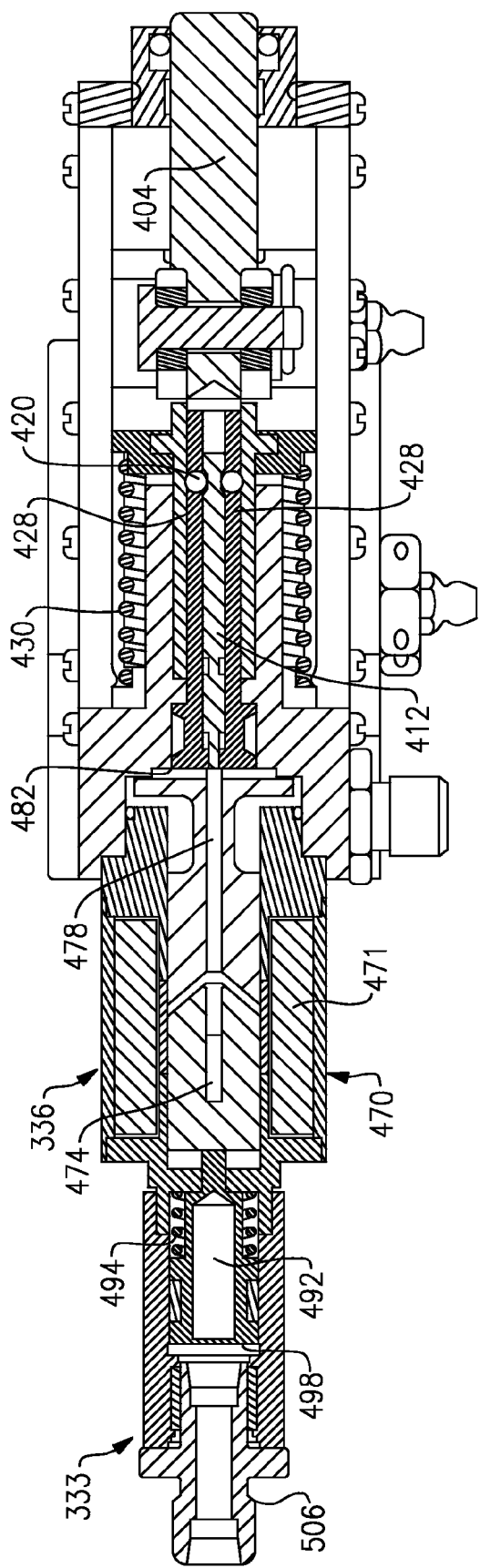
FIG. 20 is a partial side sectioned view of the uplock mechanism taken through line 20-20 of FIG. 19.
Figure 21:
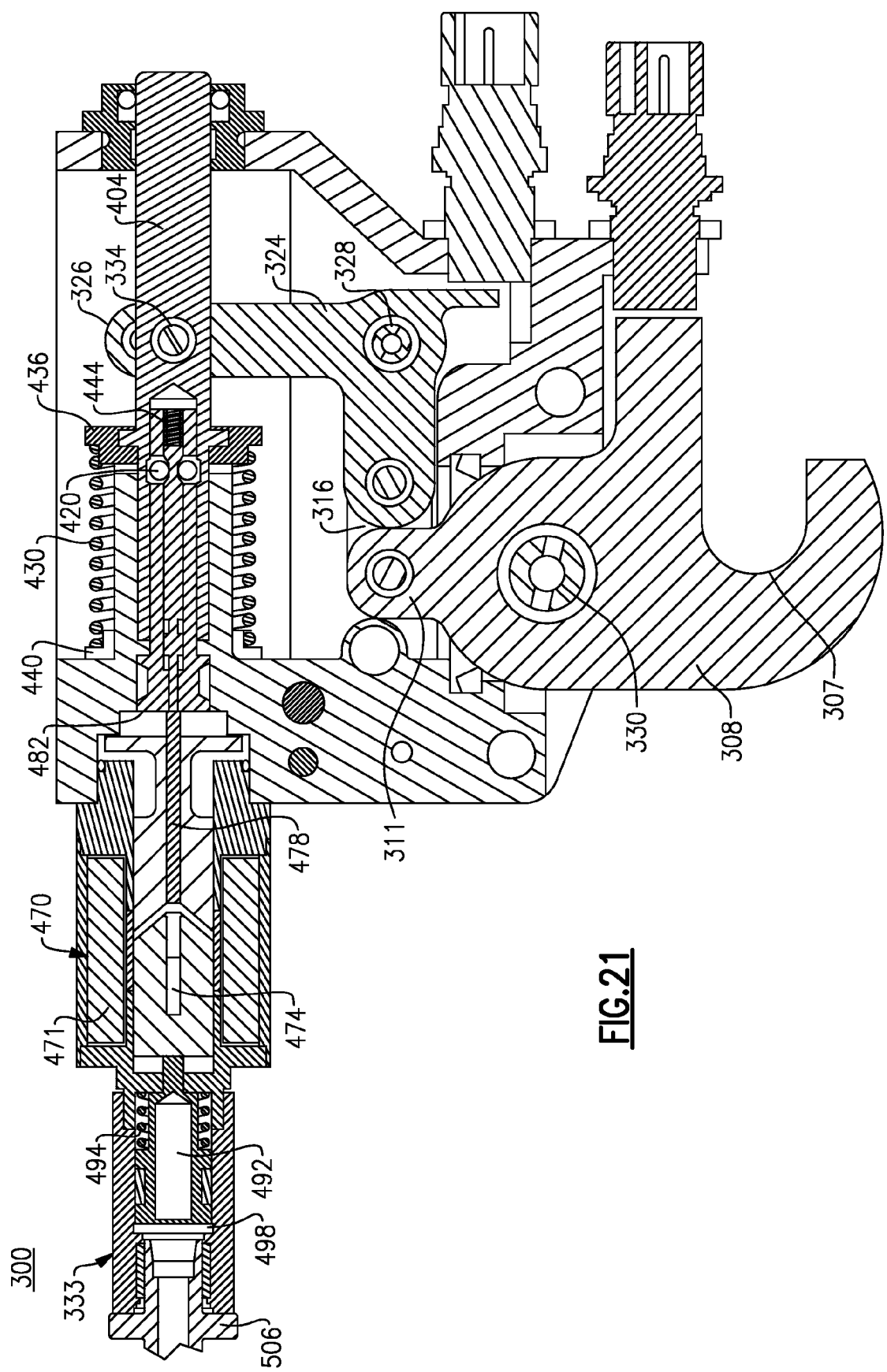
FIGS. 21-24 depict sequential side sectional views of the uplock mechanism illustrating the unlatching of the mechanism from the latched position of FIG. 18.
Figure 22:
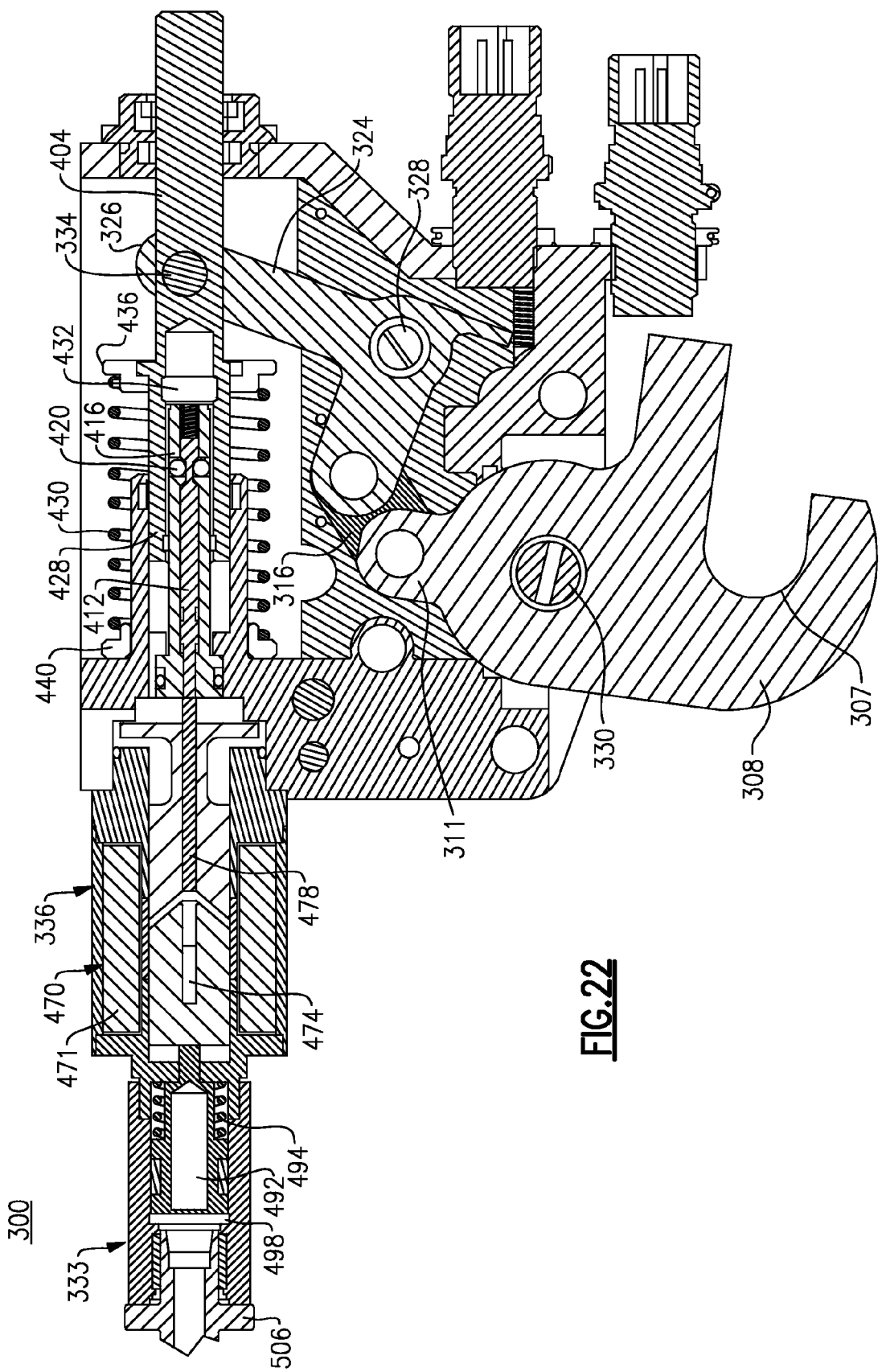
Figure 23:
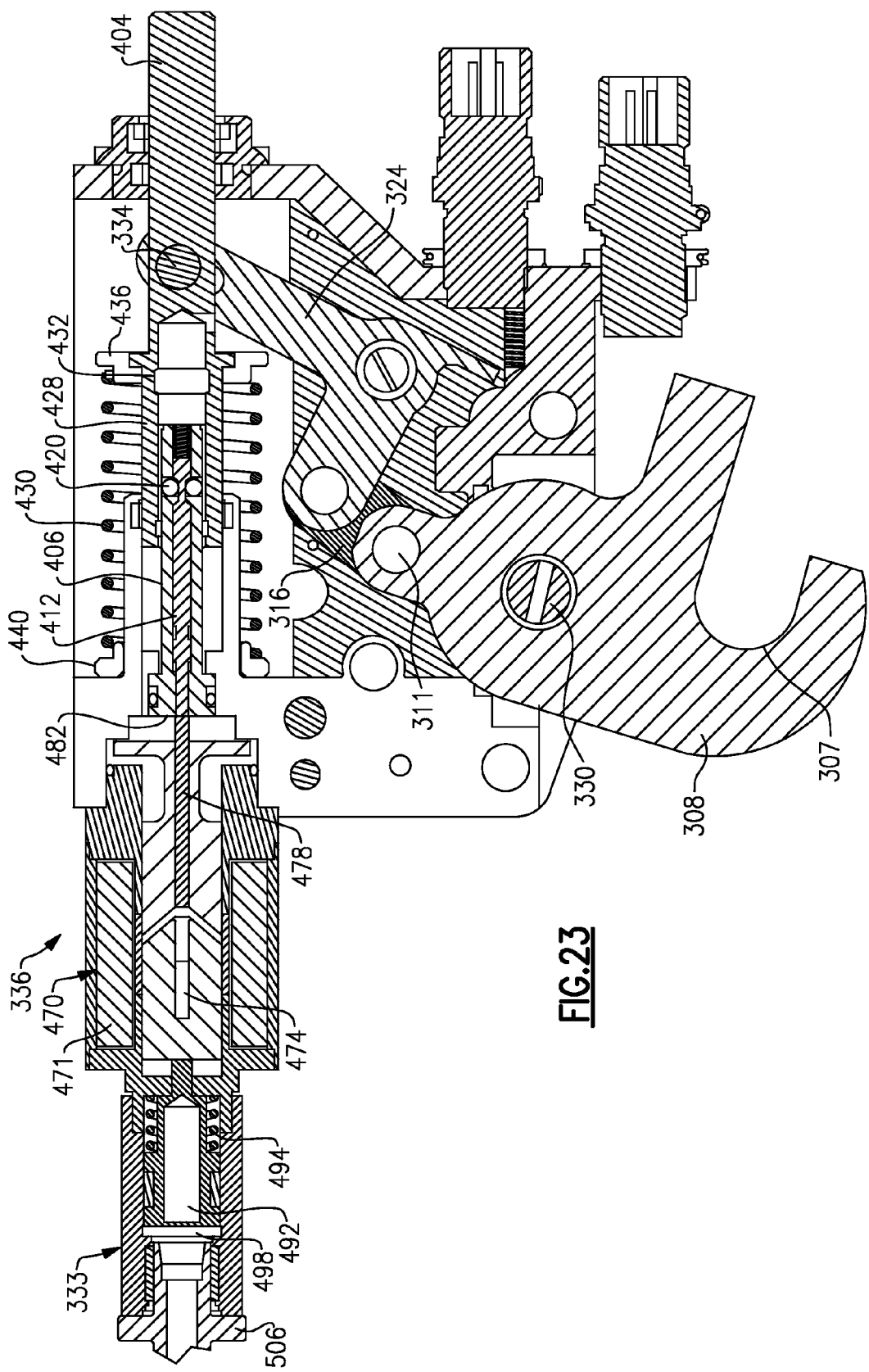
Figure 24:
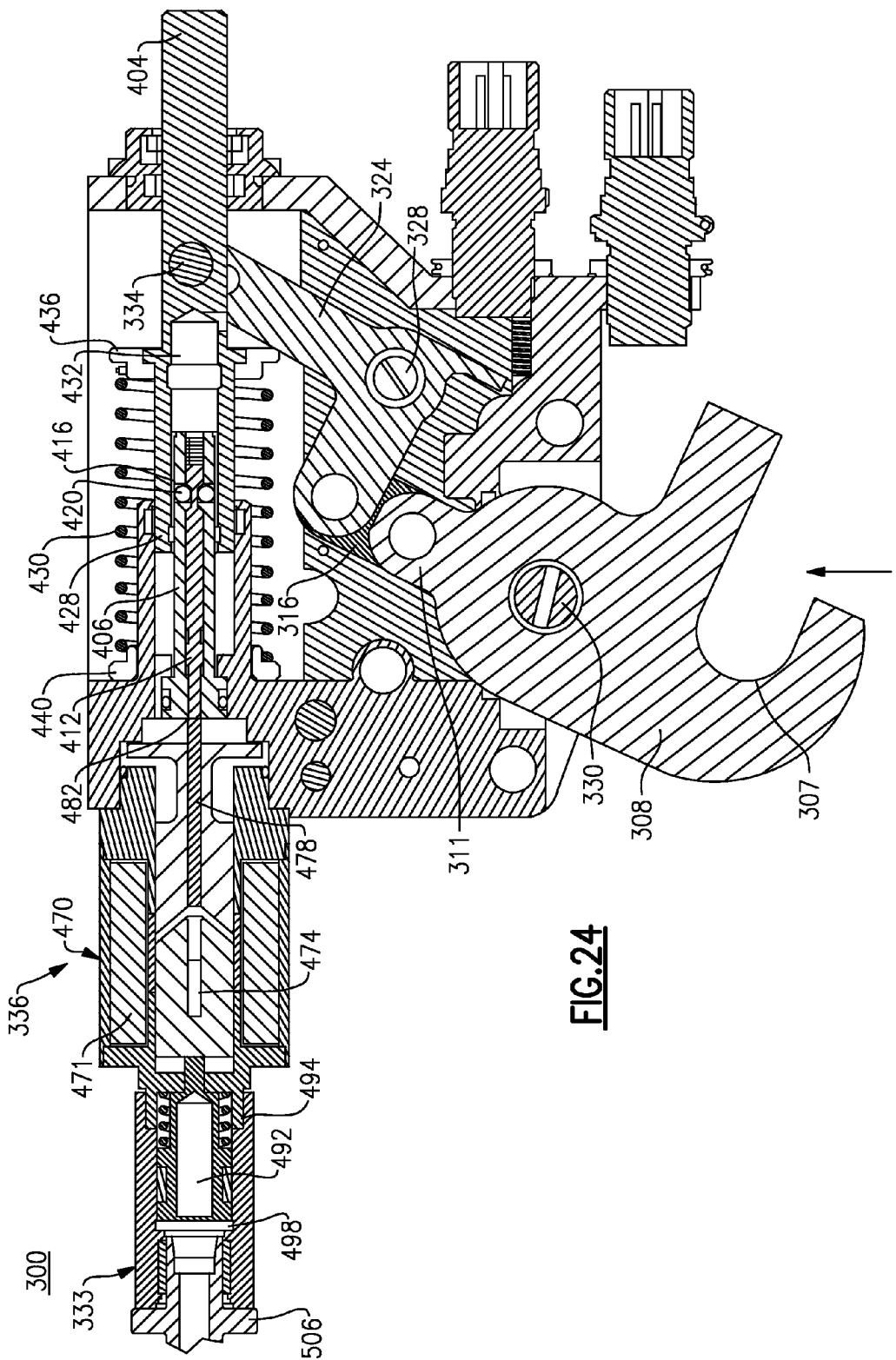

Referring to FIG. 18 specifically in this particular embodiment and in lieu of the scissor-like jaw assembly 24, FIG. 1, a J-shaped hook member 308 is provided that engages the mechanism 300 by way of an over-center linkage 304, FIG. 18. This linkage 304 consists of a number of interconnected components including the J-shaped hook member 308 having a hook portion 307, an intermediary or transfer link 316, and an L-shaped link 324, the latter being pivotally attached at one end 326 to a detent bar 404. An opposing end 311 of the J-shaped hook member 308 is connected to one end of the transfer link 316, the remaining end of the transfer link being attached by a connecting pin to a first end of the L-shaped link 324. The L-shaped link 324 is pivotally attached to a fixed portion of the mechanism 300 by means of a pivot pin 328 and the J-shaped hook member 308 is pivotally attached thereto by a pivot pin 330 and to the detent bar 404 by means of a pivot pin 334. The operation of the over-center linkage 304 is described in greater detail below.

As in the preceding embodiment, the locking mechanism 300 further includes a detent slide 406 that extends through the interior of a detent housing 332. The detent housing 332 is formed as a longitudinal member extending substantially about the exterior of an interior detent latch 412. The detent latch 412 includes a groove 416 adjacent one end that permits the inclusion of a detent ball 420, such as that shown more specifically in the enlarged view of FIG. 25. As in the preceding, a lock segment (not shown) can be alternatively used in lieu of the detent ball or other element that can selectively provide engagement. Each of the detent latch 412 and the detent slide 406 commonly extend coaxially along a longitudinal axis 417.

A movable sleeve portion 428 includes an interior annular recess 432, which is used in conjunction with the detent ball 420 for locking or latching the mechanism 300 in a manner described in greater detail below. The movable sleeve portion 428 integrally includes the detent bar 404, which as previously noted is pivotally connected by means of the pivot pin 334 to the L-shaped link 324. A compression spring 430 is attached at one end to an proximal collar 440 of the detent housing 332 and at an opposite end to an annular shoulder 436 formed on the exterior of the movable sleeve portion 428. The compression spring 430 provides a biasing force for the mechanism with regard to the over center linkage 304, FIG. 18. In addition, a detent spring 444 is provided at the distal end of the detent slide 406 to provide a bias for the latching components of the locking mechanism 300, each as described in greater detail below.

As in the preceding, an electronic actuator component 336 is also provided, this component being similar according to this exemplary version to that previously described including a solenoid valve 470, which is coaxially attached to the detent housing 332. The solenoid valve 470 includes a coil 471 that is disposed about a solenoid plunger 474 and a solenoid pin 478 wherein the solenoid pin includes a surface 482 that is engageable with the distal end of the detent slide 406. The solenoid pin 470 is movable in a direction extending along the axis 417, FIG. 18. The solenoid valve 470 is attached via bracketry or other suitable means to the detent chamber 332.

The hydraulic actuator component 333 is attached in axial relation to the electronic actuator component 336 and is defined by a chamber 492 retaining an actuator spring 494 that is connected to a movable piston head 498, wherein an inlet pressure fitting 506 is attached thereto. The actuator chamber 492 is preferably hermetically sealed and retains a quantity of a hydraulic fluid.

Figure 25:
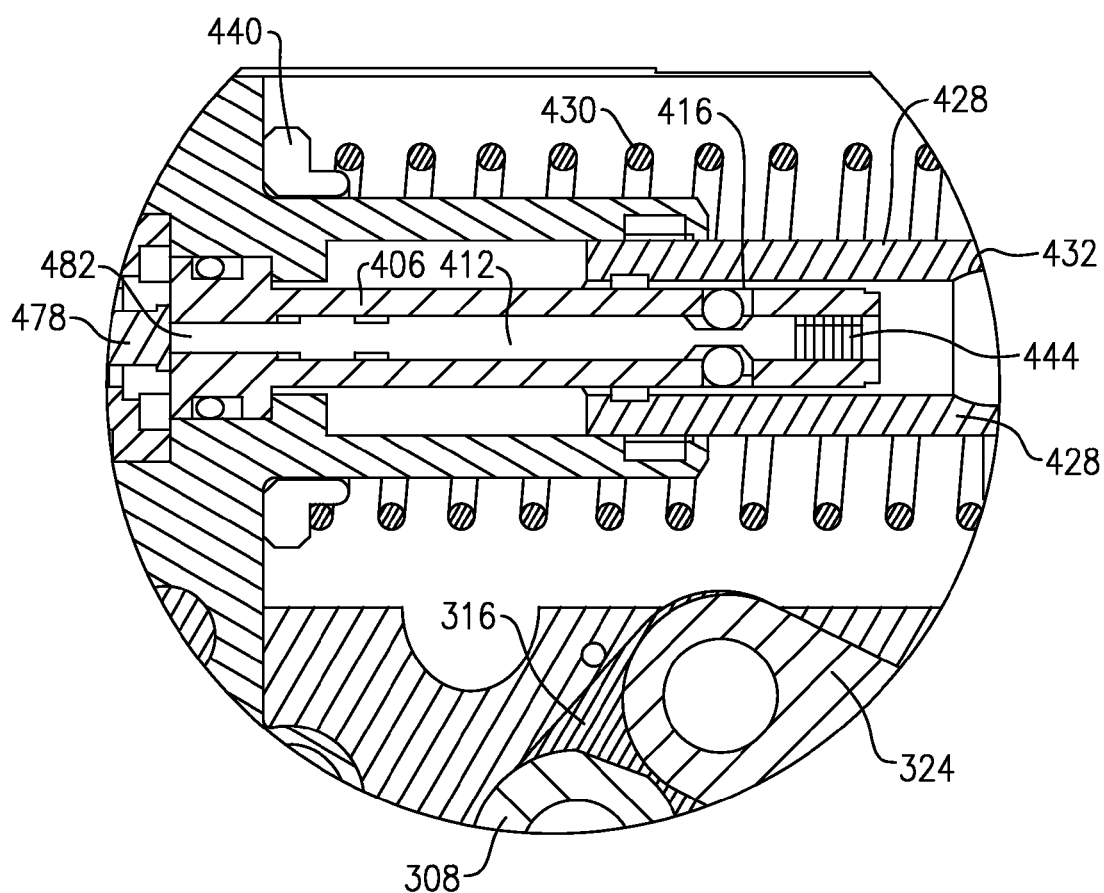
FIG. 25 is an enlarged partial view, taken in section, of the latching portion of the locking mechanism of FIG. 24, taken in the unlatched position.
Figure 26:
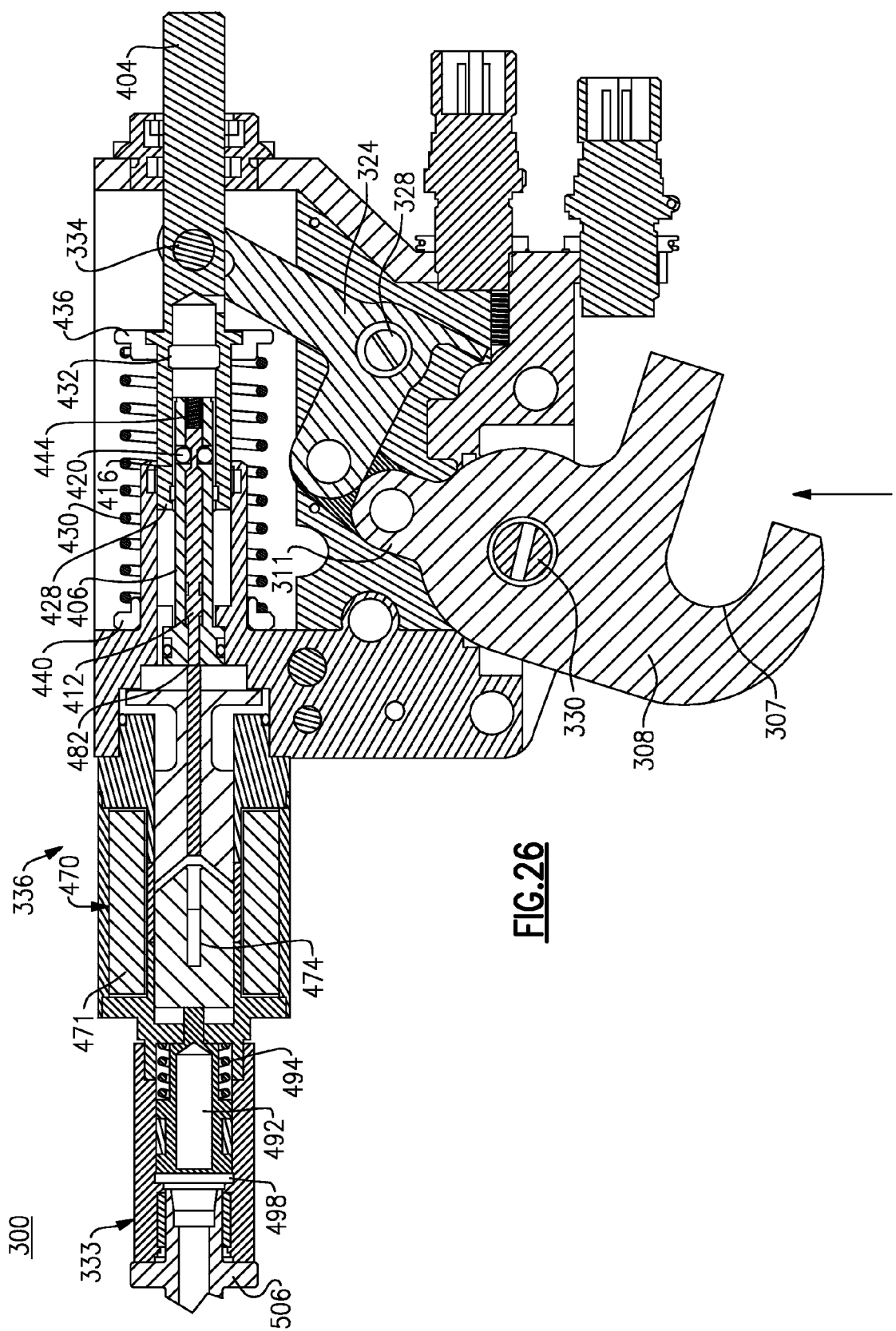
FIGS. 26-31 depict sequential side sectional views of the uplock mechanism of FIGS. 18-25, illustrating the uplock locking operation of the mechanism.
Figure 27:
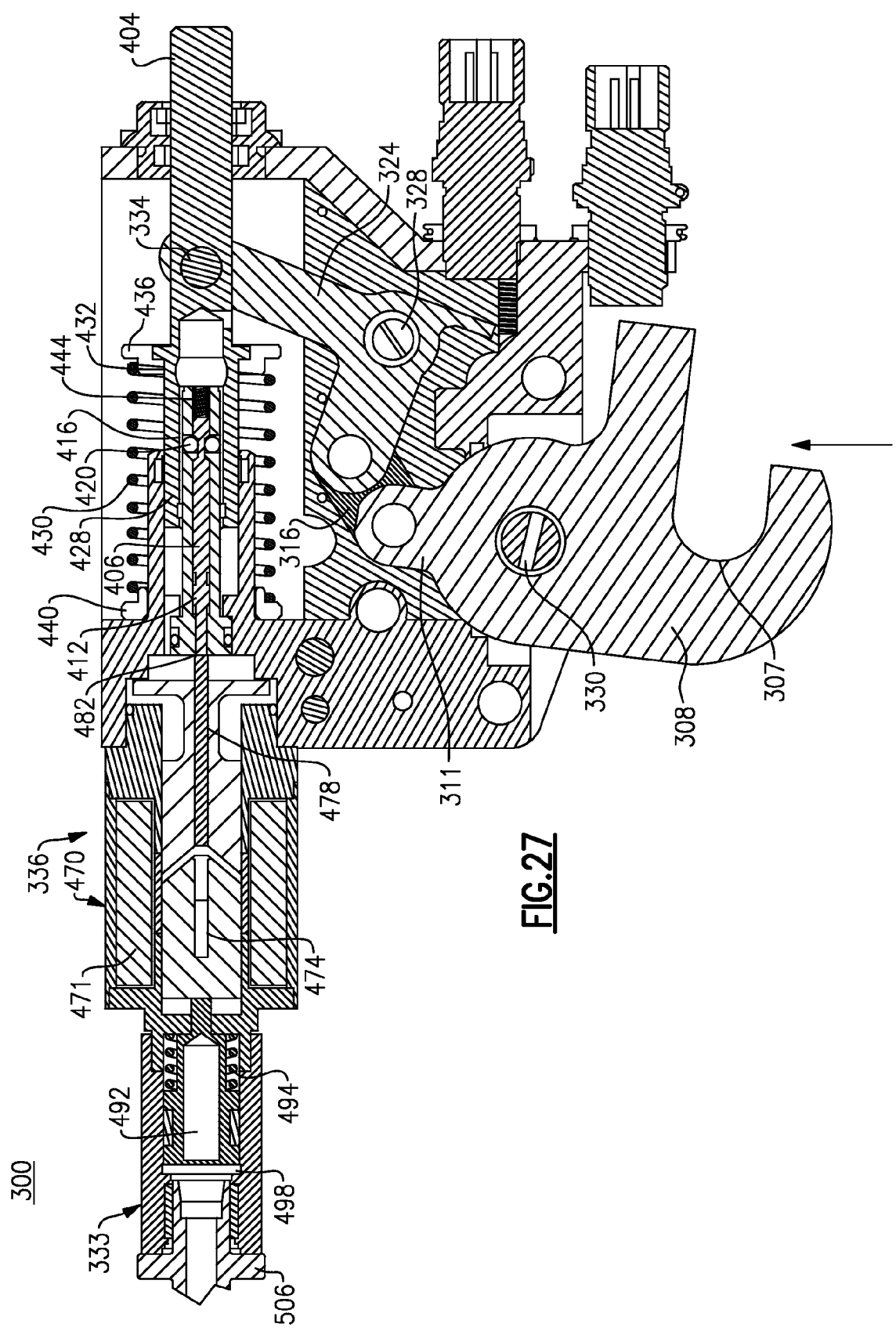
Figure 28:
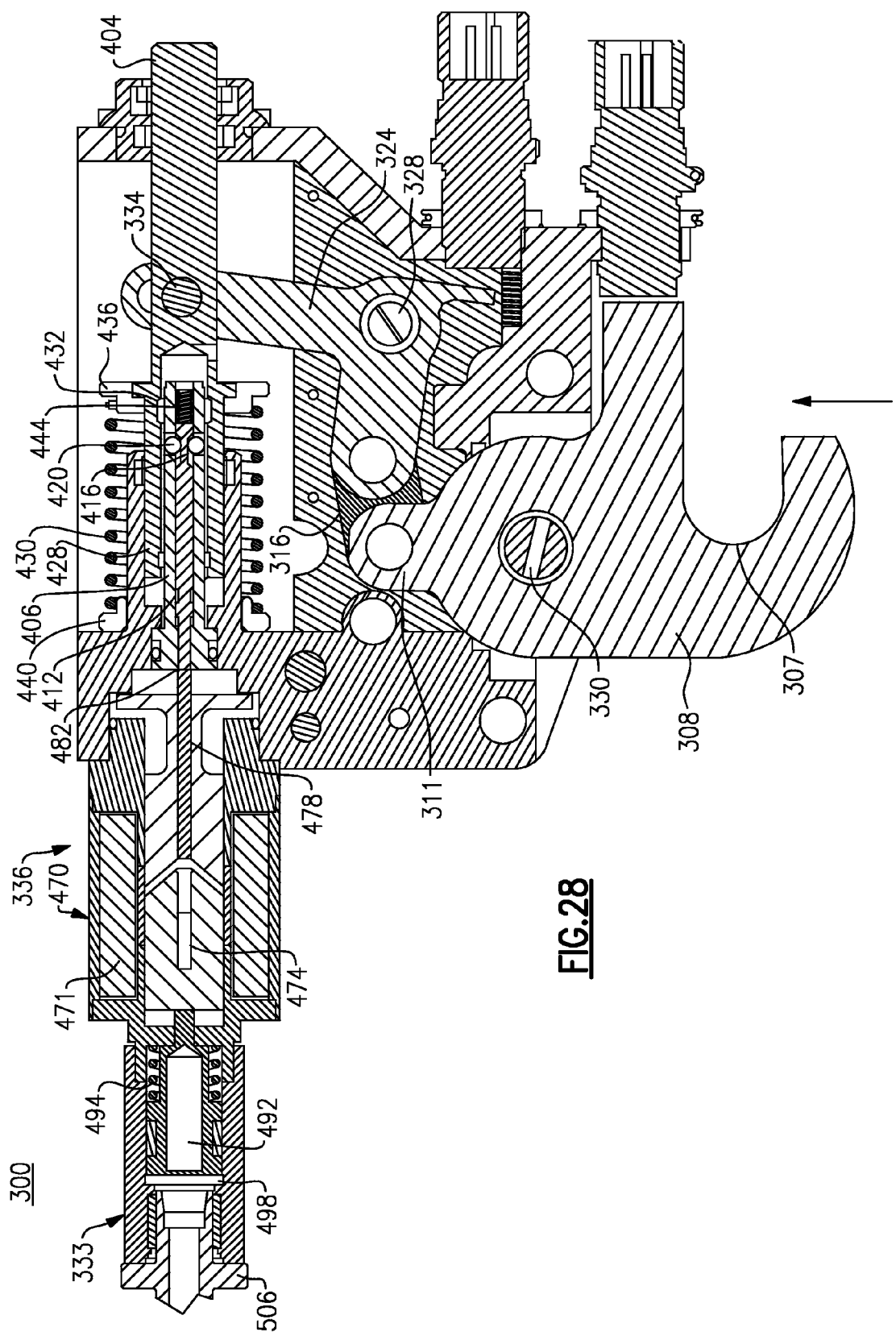
Figure 29:
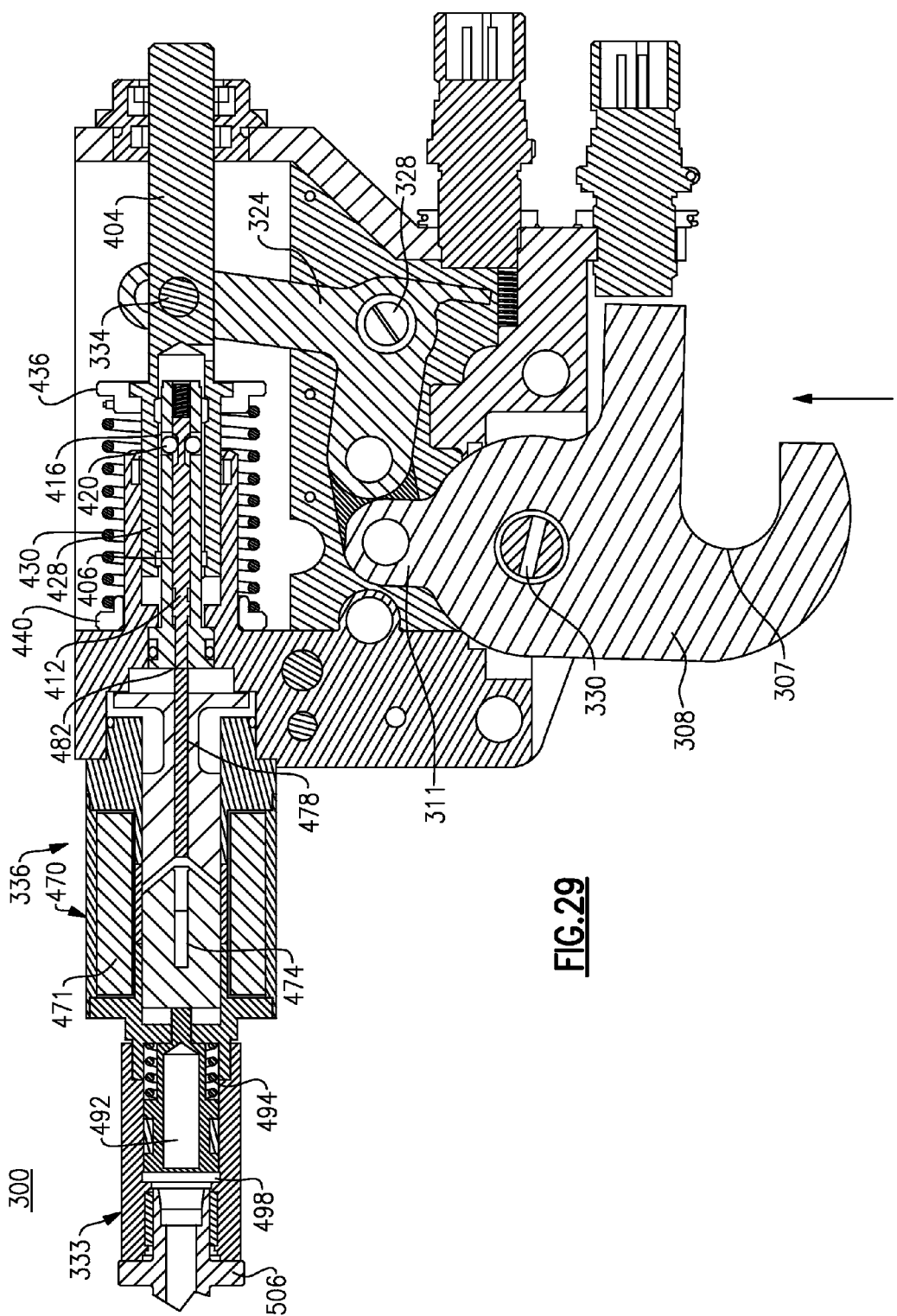
Figure 30:
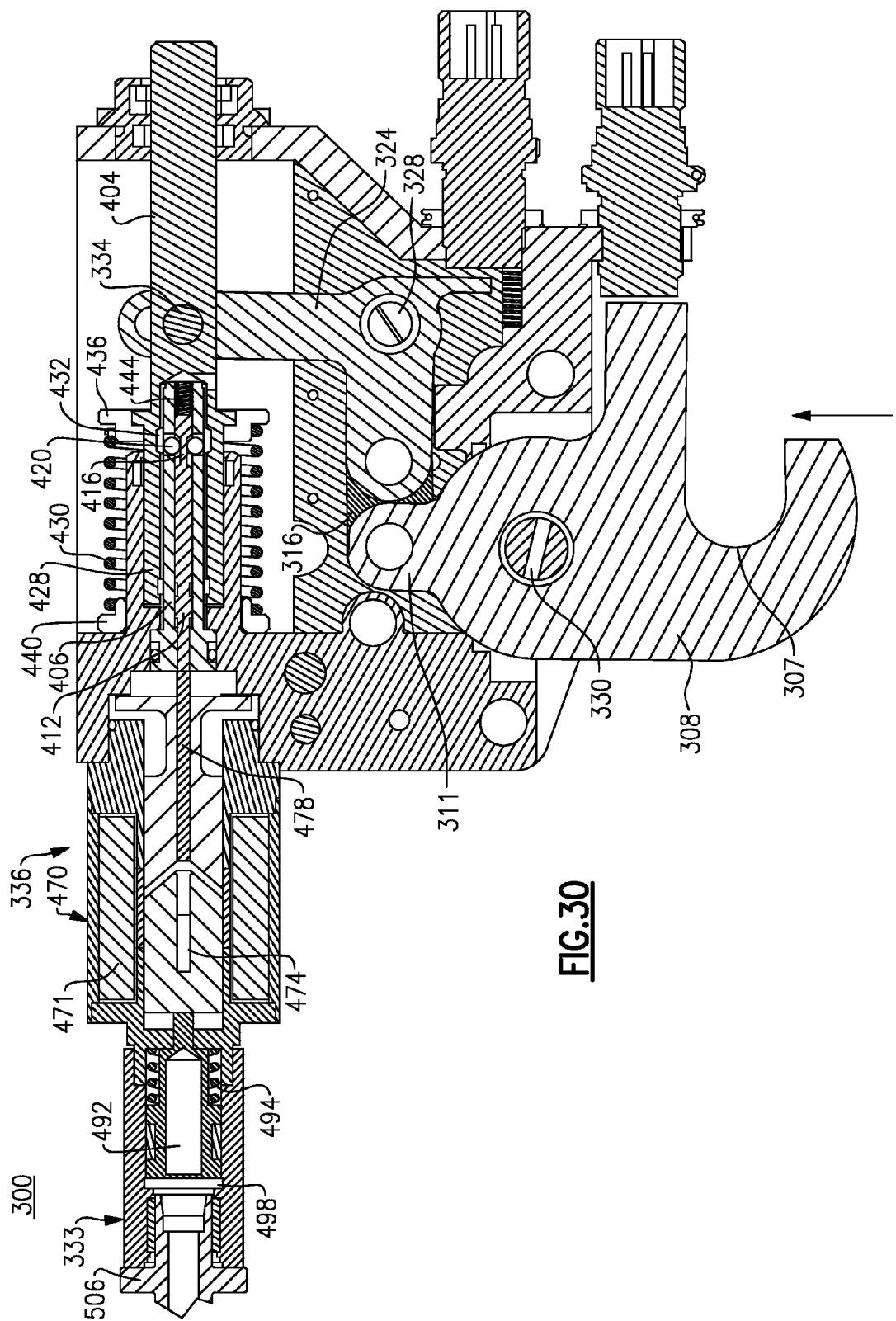
Figure 31:
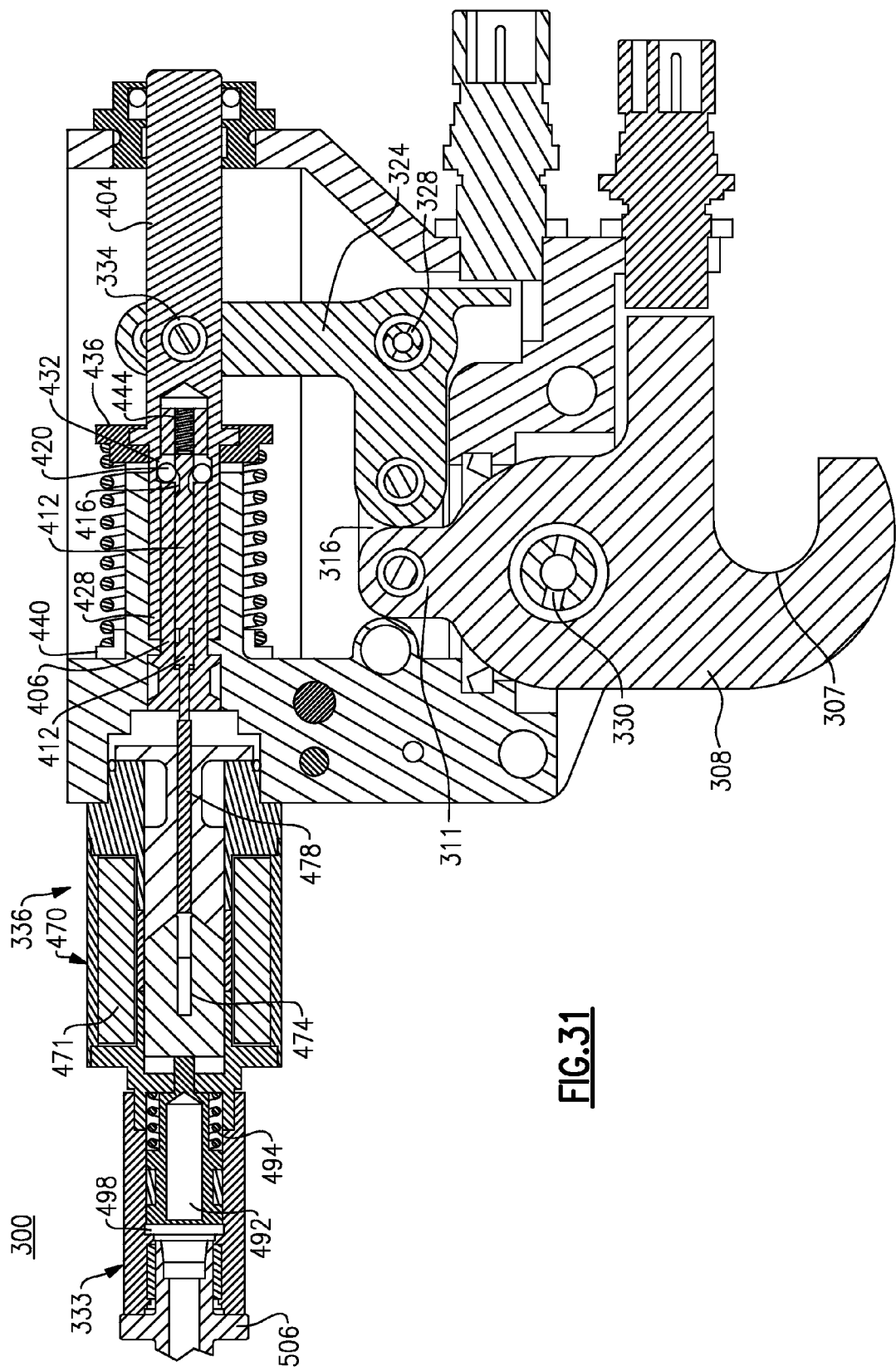

The operation of the herein described locking mechanism 300 is now initially described with reference to FIGS. 25-31 as to uplocking of the mechanism. FIG. 25 depicts the mechanism 300 in the unlatched position. In terms of providing an uplock, a landing gear roller (not shown) of the aircraft landing gear (also not shown) is initially moved mechanically in the upward direction shown in FIG. 25, and in engagement with the hook portion 307 of the J-hook member 308. As engagement between the landing roller and the hook portion 307 occurs, the J-hook member 308 is moved upwardly pivoting the J-hook member in a counterclockwise manner, based on its fixed pinned connection and as shown in FIG. 26. This pivoting action results in associated upward movement of the attached end of the transfer link 316, creating a downward movement of the opposite side of the transfer link and a subsequent counterclockwise pivot of the L-shaped link 324 about the pivot pin 328, as shown in the sequential views depicted at FIGS. 27-31.

The resulting counterclockwise pivotal movement of the L-shaped link 324 about the pivot pin 334 induced by the upward movement of the landing gear against the over center linkage 304, FIG. 18, causes the detent arm 404 to be shifted axially in the direction 417 toward the actuator components 333, 336 and the detent housing 332. As a result, the movable sleeve portion 428 within the detent chamber 332 is also shifted axially against the biasing force of the compression spring 430. The movable sleeve portion 428 therefore translates relative to the detent latch 412 until the recess 432 aligns with the groove 416 of the detent latch 412, thereby dislodging the detent ball 420 from the groove 416 of the detent latch. When the movable sleeve portion 428 has completed its axial movement in the direction 417, FIG. 31, the detent ball 420 is displaced from the groove 416 and engaged into the recess 432 of the movable sleeve portion 428, thereby locking or latching the movable sleeve portion and the mechanism 300 in this position. The applied force to the landing gear can then be removed with the uplock being fully engaged without either actuator component 333, 336 yet being utilized according to this embodiment.

The locking mechanism 300 can be unlatched or unlocked by way of either of the coaxially positioned mechanical and/or hydraulic actuator components 333, 336. As in the preceding, the hydraulic actuator component 333 can be used to release the uplock according to a first or "standard" mode of operation or alternatively, the electronic actuator component 336 can be used to initiate the release.

Attention is now directed to FIGS. 21-24 in which the first or "standard" mode of operation is described in greater detail. Initiation of the hydraulic actuator component 333 in this mode proceeds wherein pressurization of the chamber 492 occurs against the bias of the actuator spring 494. As a result, the piston head 498 is caused to move axially in the direction 417, FIG. 18, within the sealed actuator chamber 492 and into engagement with the axially aligned solenoid plunger 474 and the solenoid pin 478. The engagement surface 482 of the solenoid pin 478 is therefore caused to engage against and cause axial movement of the advancing detent latch 412 against the bias of the detent spring 444. This axial movement of the detent latch 412 dislodges the detent ball 420 from the recess 432 of the movable sleeve portion 428 and into the groove 416 of the advancing detent latch. The bias of the detent spring 444 restores the solenoid pin to its original axial position. As a result of the release of the detent ball 420 and also under the bias created by the compression spring 430, the movable sleeve portion 428 is caused to move axially in the direction 417, FIG. 18, away from the detent chamber 332. In the meantime, this movement causes the L-shaped link 324 to pivot clockwise, thereby shifting the transfer link 316 and J-shaped hook member 308 to their original positions, as shown sequentially in FIGS. 22-25.

According to the alternative mode of operation, such as when normal aircraft power (i.e., the hydraulic actuator component) is no longer or temporarily unavailable, activation of the solenoid valve 470 of the locking mechanism 300 can be facilitated by means of a switch (not shown) in the cockpit of the aircraft (not shown) that energizes the coil 471 of the solenoid, causing the solenoid plunger 474 to engage the solenoid pin 478. In this instance, the solenoid valve 470 can be powered, such as described according to the previous embodiment, by a suitable compact battery (not shown).

In this mode, engagement of the surface 482 of the solenoid pin 478 against the detent latch 412 causes relative axial movement of the latch, in a manner similar to that effected by the hydraulic actuator component 333 as described above. As in the preceding, the axial movement provided by engagement of this actuator dislodges the detent ball 420 from the recess 432 of the movable sleeve portion 428 against the bias of the detent spring 444 and causes the compression spring 430 and detent spring to act upon the mechanism 300 under the biasing forces thereof to restore the components to the unlatched position of FIG. 25.

As in the preceding embodiment, very low power is required for energization of the herein described assembly. That is, a very low stroke of the solenoid plunger/pin 474/478 (i.e., less than 0.1 inch according to this embodiment) is required in order to unlock the detent ball 420, requiring relatively low power. The over-center linkage 304 according to this second embodiment is even more compact than that of the first embodiment given its position relative to the detent chamber, affording additional savings in space allocation.

PARTS LIST FOR FIGS. 1-31

20 locking mechanism
24 jaw assembly
28 spring release
30 actuator assembly
32 detent housing
33 hydraulic actuator component
36 electronic actuator component
44 upper over-center links
48 lower over-center links
52 over-center pin
56 extension spring
60 latch member
64 latch member
65 curved end
68 distal end, over center links
69 upper pin
71 lower pin
72 end, link
76 guide
79 flattened lower or bottom surface, guide
80 uplock pivot bolt
84 slot or cavity
88 upper portion
92 guide pin
96 curved slot
100 mounting brackets
106 detent slide
112 detent latch
116 groove
117 axis
119 pivot axis
120 detent ball
128 movable sleeve portion
132 recess
136 annular shoulder
140 widened portion, detent slide
144 recess
148 detent spring
152 widened portion, detent latch
170 solenoid valve
171 coil, solenoid
174 solenoid plunger
178 solenoid pin
182 surface, pin engagement
192 housing, actuator
194 actuator spring
198 piston head
206 pressure fitting
300 locking mechanism
304 over-center linkage
307 hook portion
308 J-shaped hook member
316 transfer link
324 L-shaped link
328 pivot pin
329 pivot pin
330 pivot pin
332 detent chamber
333 hydraulic actuator component
334 pivot pin
336 electronic actuator component
404 detent arm or bar
406 detent slide
412 detent latch
416 groove
417 axis, longitudinal
420 detent ball
428 movable sleeve portion
430 compression spring
432 recess, annular
436 annular shoulder
440 proximal collar
444 detent spring
470 solenoid valve
471 coil, solenoid
474 plunger, solenoid
478 pin, solenoid
482 surface, pin engagement
492 chamber
494 actuator spring
498 piston head
506 pressure fitting, inlet It will be readily apparent that other variations and modifications are possible within the intended scope of the present invention, as defined by the following claims.

The invention claimed is:

1. A locking mechanism selectively operable in one of a first mode and a second mode, said locking mechanism comprising:
   a hydraulic actuator component that engages a locking member in the first mode; and
   an electronic actuator component that engages said locking member in the second mode, each of the hydraulic actuator component and electronic actuator component being arranged coaxially with one another.

2. A locking mechanism as recited in claim 1, including a mechanical detent that can be acted upon by either the hydraulic actuator component in the first mode or the electronic actuator component in the second mode to release said locking member.

3. A locking mechanism as recited in claim 1, wherein each of the coaxial hydraulic and electronic actuator components are maintained over center relative to a spring release attached to the locking member to engage and release a movable member connected to said locking member.

4. A locking mechanism as recited in claim 2, wherein said locking mechanism is used in conjunction with aircraft landing gear.

5. A locking mechanism as recited in claim 2, wherein said mechanical detent is arranged in a chamber along said common axis and relative to the electronic and hydraulic actuator components.

6. A locking mechanism as recited in claim 4, wherein said locking member comprises a jaw assembly having pivoting latch members, said latch members being maintained in a vertical attitude such that the weight of the landing gear will assist in the opening of same when the mechanical detent is released.

7. A locking mechanism as recited in claim 5, wherein said locking member comprises a J-hook connected to said over center assembly and connected to an over center linkage assembly.

8. A locking mechanism as recited in claim 7, wherein said over-center linkage is disposed beneath said detent chamber.

9. An uplock mechanism for use with aircraft landing gear, said mechanism comprising:
   a hydraulic actuator component that engages a locking member in the first mode;
   an electronic actuator component arranged coaxially with the hydraulic actuator component that engages said locking member in said second mode, each of the coaxial actuator components being maintained in relation to one another along a common axis and over center relative to a spring release attached to the locking member to engage and release a movable member connected to said locking member.

10. An uplock mechanism as recited in claim 9, wherein said locking member includes a detent that latches when the mechanism is uplocked in one of said first and second modes, said hydraulic and electronic actuator components being aligned to selectively unlatch said mechanism.

11. An uplock mechanism as recited in claim 8, wherein each of the coaxial actuator components are maintained over center relative to a spring release attached to the locking member to engage and release a movable member connected to said locking member.

12. An uplock mechanism as recited in claim 10, wherein said detent is arranged coaxially in a chamber along the common axis and relative to the electronic and hydraulic actuator components.

13. An uplock mechanism as recited in claim 10, wherein said locking member comprises a jaw assembly having pivoting latch members, said latch members being maintained in a vertical attitude such that the weight of the landing gear will assist in the opening of same when the mechanical detent is released.

* * * * *